US012671147B2

(12) United States Patent
Allen et al.

(10) Patent No.: US 12,671,147 B2
(45) Date of Patent: Jun. 30, 2026

(54) BATTERY TAB CONFIGURATION

(71) Applicant: A123 Systems LLC, Novi, MI (US)

(72) Inventors: David W. Allen, Farmington, MI (US);
James Dawson, Macomb, MI (US)

(73) Assignee: A123 SYSTEMS LLC, Novi, MI (US)

( * ) Notice: Subject to any disclaimer, the term of this
patent is extended or adjusted under 35
U.S.C. 154(b) by 389 days.

(21) Appl. No.: 16/606,701

(22) PCT Filed: Apr. 18, 2018

(86) PCT No.: PCT/US2018/028193
§ 371 (c)(1),
(2) Date: Oct. 18, 2019

(87) PCT Pub. No.: WO2018/195218
PCT Pub. Date: Oct. 25, 2018

(65) Prior Publication Data
US 2020/0136121 A1 Apr. 30, 2020

Related U.S. Application Data

(60) Provisional application No. 62/488,009, filed on Apr.
20, 2017.

(51) Int. Cl.
*H01M 50/516* (2021.01)
*H01M 50/211* (2021.01)
(Continued)

(52) U.S. Cl.
CPC ....... *H01M 50/516* (2021.01); *H01M 50/211*
(2021.01); *H01M 50/505* (2021.01);
(Continued)

(58) Field of Classification Search
CPC ..... Y02E 60/10; H01M 50/55; H01M 50/588;
H01M 50/557; H01M 50/584; H01M
50/553; H01M 50/529; H01M 50/514
See application file for complete search history.

(56) References Cited

U.S. PATENT DOCUMENTS 6,197,074 B1 * 3/2001 Satou .................. H01M 50/531
429/211
2008/0299453 A1 12/2008 Shinyashiki et al.
(Continued)

FOREIGN PATENT DOCUMENTS

CN 204391179 U 6/2015
CN 106133948 A 11/2016
(Continued)

OTHER PUBLICATIONS

Ishi JP 2003 323879 machine translation (Year: 2003).*
(Continued)

*Primary Examiner* — Ula C Ruddock
*Assistant Examiner* — Anna Korovina
(74) *Attorney, Agent, or Firm* — McCoy Russell LLP

(57) ABSTRACT
Systems and methods for constructing and assembling a
battery are provided. A battery, may comprise a cell tab
support and a plurality of stacked battery cells, where a
portion of the cells extends through the cell tab support and
is folded over on top of the cell tab support. Each of the
plurality of stacked battery cells may comprise two oppo-
sitely charged electrode tab terminals bent in opposite direc-
tions below the cell tab support, and bent in the same
direction over the top of the cell tab support.

16 Claims, 13 Drawing Sheets

(51) Int. Cl.

| | |
|---|---|
| *H01M 50/505* | (2021.01) |
| *H01M 50/55* | (2021.01) |
| *H01M 50/553* | (2021.01) |
| *H01M 50/562* | (2021.01) |
| *H01M 50/242* | (2021.01) |
| *H01M 50/289* | (2021.01) |

(52) U.S. Cl.

CPC ......... *H01M 50/55* (2021.01); *H01M 50/553* (2021.01); *H01M 50/562* (2021.01); *H01M 50/242* (2021.01); *H01M 50/289* (2021.01)

(56) References Cited

U.S. PATENT DOCUMENTS

| | | | | |
|---|---|---|---|---|
| 2009/0169990 | A1* | 7/2009 | Gardner | H01M 50/54 |
| | | | | 429/179 |
| 2009/0323293 | A1* | 12/2009 | Koetting | H01M 50/516 |
| | | | | 29/730 |
| 2013/0280587 | A1 | 10/2013 | Kim | |
| 2014/0248518 | A1* | 9/2014 | Yoshioka | H01M 50/502 |
| | | | | 429/90 |
| 2015/0044543 | A1 | 2/2015 | Yoon et al. | |
| 2017/0040585 | A1 | 2/2017 | Park | |
| 2018/0076487 | A1* | 3/2018 | Lee | H01M 50/264 |
| 2018/0229621 | A1* | 8/2018 | Roh | H01M 50/503 |
| 2020/0020902 | A1* | 1/2020 | Suzuki | H01M 50/176 |

FOREIGN PATENT DOCUMENTS

| | | | | | | |
|---|---|---|---|---|---|---|
| EP | 3340338 | A1 | * | 6/2018 | ............ | G01R 31/36 |
| JP | 2000048867 | A | * | 2/2000 | | |
| JP | 2003323879 | A | * | 11/2003 | | |
| JP | 2012038495 | A | * | 2/2012 | | |
| KR | 20120010928 | A | * | 2/2012 | | |
| KR | 20120140093 | | * | 12/2012 | | |
| KR | 20160111590 | A | | 9/2016 | | |
| WO | 2006101343 | A1 | | 9/2006 | | |
| WO | WO-2017138709 | A1 | * | 8/2017 | ............ | G01R 31/36 |
| WO | WO-2017146384 | A1 | * | 8/2017 | ............ | H01M 50/50 |

OTHER PUBLICATIONS

Ji et al., KR 2012-0140093 Machine Translation (Year: 2012).*

Lee et al., KR-20120010928 Machine Translation (Year: 2012).*

Kiba et al., JP-2000048867 Machine Translation (Year: 2000).*

Nagai et al., JP-2012038495 Machine Translation (Year: 2012).*

ISA United States Patent and Trademark Office, International Search Report Issued in Application No. PCT/2018/028193, Jun. 27, 2018, WIPO, 2 pages.

European Patent Office, Extended European Search Report Issued in Application No. 18787951.5, Dec. 18, 2020, Germany, 7 pages.

State Intellectual Property Office of the People's Republic of China, Office Action and Search Report Issued in Application No. 201880026381.7, Nov. 29, 2021, 25 pages. (Submitted with Partial Translation).

* cited by examiner

BATTERY TAB CONFIGURATION

CROSS REFERENCE TO RELATED APPLICATIONS

The present application is a U.S. National Phase of International Patent Application No. PCT/US2018/028193, entitled "BATTERY TAB CONFIGURATION", and filed on Apr. 18, 2018. International Patent Application No. PCT/US2018/028193 claims priority to U.S. Provisional Application No. 62/488,009, entitled "Battery Tab Configuration", and filed on Apr. 20, 2017. The entire contents of each of the above-listed applications are hereby incorporated by reference for all purposes.

FIELD

The present description relates to the architecture, construction and operation of a battery, such as a lithium-ion vehicle battery.

BACKGROUND AND SUMMARY

An electric battery is a device that stores electric energy by means of an electrochemical cell. Vehicle batteries, such as 48V micro-hybrid vehicle batteries, include a plurality of stacked cells that are electrically connected in series and/or parallel to meet the current and/or voltage requirements of the vehicle. Batteries comprising prismatic or pouch type cells are constructed by stacking the cells and then electrically connecting the cells by welding the cells tab terminals to a bus bar and/or directly welding the cell tab terminals together.

However, the inventors herein have recognized potential issues with such battery systems. As one example, when attempting to weld the cell tab terminals of different cells, air gaps and mismatching may occur between the cells tab terminals because of accumulated tolerances from trimming, pre-bending, and stacking the cells. Specifically, the cell tab terminals of prismatic, pouch-type cells are spaced away from one another when the cells are stacked since the cell tab terminals are typically thinner than the cell pouches from which they extend. Thus, the cell tab terminals must be trimmed, bent, and/or modified after they have been stacked to create sufficient surface contact with one another for subsequent welding. In particular, the tab terminals of adjacent cells must be bent in opposite directions to make contact with one another. Such bending requires a two-step, bi-directional machine tab-rolling process, resulting in a longer and more expensive manufacturing process. Rolling the tab terminals in two consecutive, independent steps, leads to more mismatching and air gaps between the tab terminals. The air gaps and mismatching reduce the contact area between the cells tab terminals, thus reducing the integrity of the resulting weld, which can lead to premature battery failure. Further, bending the tab terminals of adjacent cells in opposite directions limits how close the adjacent cells can be stacked to one another, thereby increasing the packaging size of the battery.

In one example, the issues described above may be at least partially addressed by a battery cell, comprising a first electrode terminal, bent in a first direction below a cell tab support, and rolled over a top of the cell tab support in the first direction, and a second electrode terminal, bent in a second direction, opposite the first direction, below the cell tab support, and rolled over the cell tab support in the first direction. The second electrode terminal may be more bent below the cell tab support than the first electrode terminal.

In yet another example, a battery may comprise a cell tab support and a plurality of stacked battery cells, each of the plurality of stacked battery cells comprising two oppositely charged electrode tab terminals bent in opposite directions below the cell tab support, and comprising protruding portions which protrude through the cell tab support and are bent in the same direction over the cell tab support. One of the tab terminals of each cell may be bent more than the other tab terminal, and the cells may be stacked so that the more bent tab terminal abuts the less bent tab terminal of an adjacent cell. The tab terminals may be bent over the cell tab support back towards the cell including the more bent tab terminal.

In another example, a method for electrically coupling battery cells may comprise, prior to stacking the cells: bending a first electrode tab of each of the cells in a first direction, bending a second electrode tab of each of the cells in an opposite second direction, stacking the cells, and rolling the electrode tabs of the cells in the first direction over a cell tab support.

In this way by pre-bending the cell tab terminals of each cell in opposite directions, the cell tab terminals of adjacent cells to be welded may lie in face sharing contact with one another before the terminals are rolled over the cell tab support together. Rolling the already touching terminals over the cell tab support together, increases surface contact between the terminals, reduces air gaps between the terminals, and therefore increases the integrity of the subsequent weld between tab terminals.

Further, by stacking the cells so that the more bent terminal of one cell abuts the less bent terminal of an adjacent cell, and then rolling the tab terminals of the adjacent cells back toward the cell containing the more bent terminal (in a direction opposite the direction in which the more bent tab terminal was originally bent), the distance between the cells may be reduced, and thus the stacking density of the cells may be increased, thereby reducing the size of the battery.

Still further, by pre-bending and stacking the cells in the manner described above, all of the cell terminals for the cells of a battery may be rolled together, concurrently, and in one direction, thus reducing manufacturing time and expense.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1A-11 are drawn to scale, although other relative dimensions may be used, if desired.

DETAILED DESCRIPTION

Figure 1A:
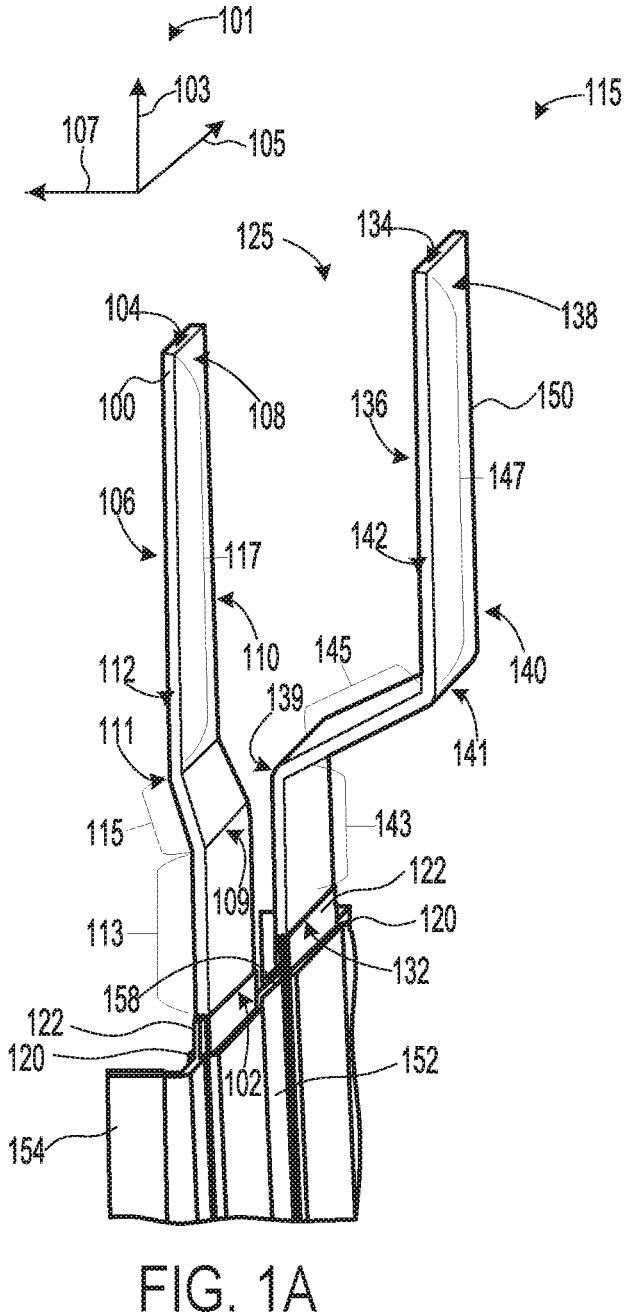
FIG. 1A shows a side isometric view of pre-folded tab terminals of an electrochemical cell of a battery, in accordance with an embodiment of the present disclosure.
Figure 4:
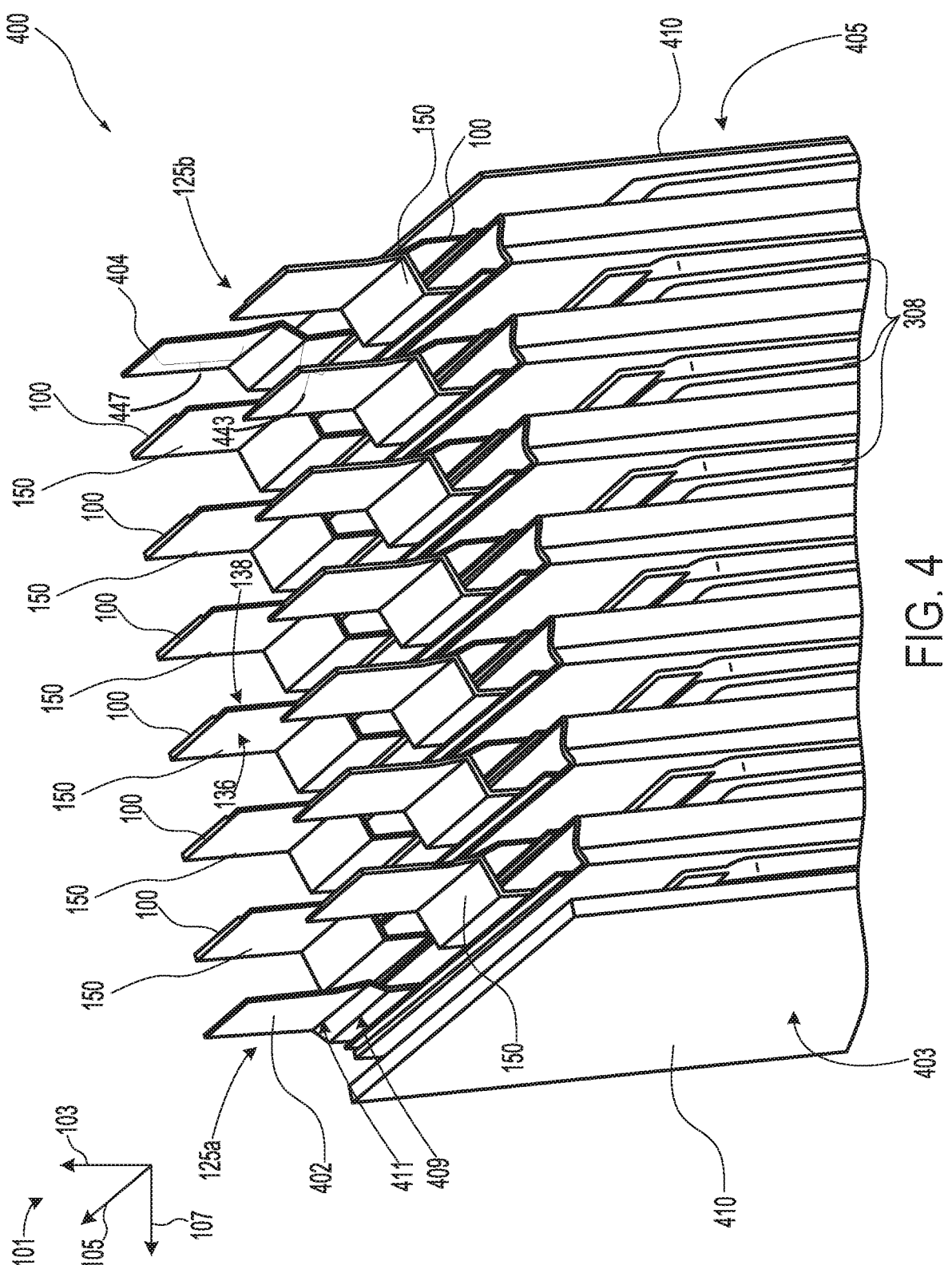
FIG. 4 shows a side isometric view of a plurality of the electrochemical cells of FIGS. 1A-2, stacked to form an array, in accordance with an embodiment of the present disclosure.

The following description relates to systems and methods for assembling a battery. In particular, the disclosure relates to the process of stacking and welding battery cells that include electrode tabs (also referred to herein as cell tab terminals). When welding battery cell tab terminals together and/or to a bus bar, air gaps and mismatching of the cell tab terminals decrease contact area between surfaces to be welded, reducing the integrity of the resulting weld. However, as shown in the examples of FIGS. 1A-2, the battery cell tab terminals may be pre-folded, prior to cell stacking, to increase the contact area between welded tab terminals, and thus increase the integrity of the welds. For example, the negative and positive cell tab terminals of a cell may be bent in opposite directions. One of the tab terminals may be bent more than the other tab terminal, such that the end of the more bent tab terminal is more offset from the center of the cell pouch than the less bent tab terminal. In particular, each cell tab terminal of a given cell may be bent towards a cell tab terminal of an adjacent cell, but the two cell tab terminals of each cell may be bent in opposite directions, towards different adjacent cells. Thus, one of the cell tab terminals may be offset from the cell in a first direction towards a first adjacent cell, and the other cell tab terminal may be offset from the cell in a second direction, opposite the first direction, towards a second adjacent cell that is positioned on an opposite side of the cell as the first adjacent cell. In this way, the oppositely charged tab terminals of adjacent cells may be aligned and in face sharing contact with one another when the cells are stacked, as shown in the example of FIG. 4.

Figure 3:
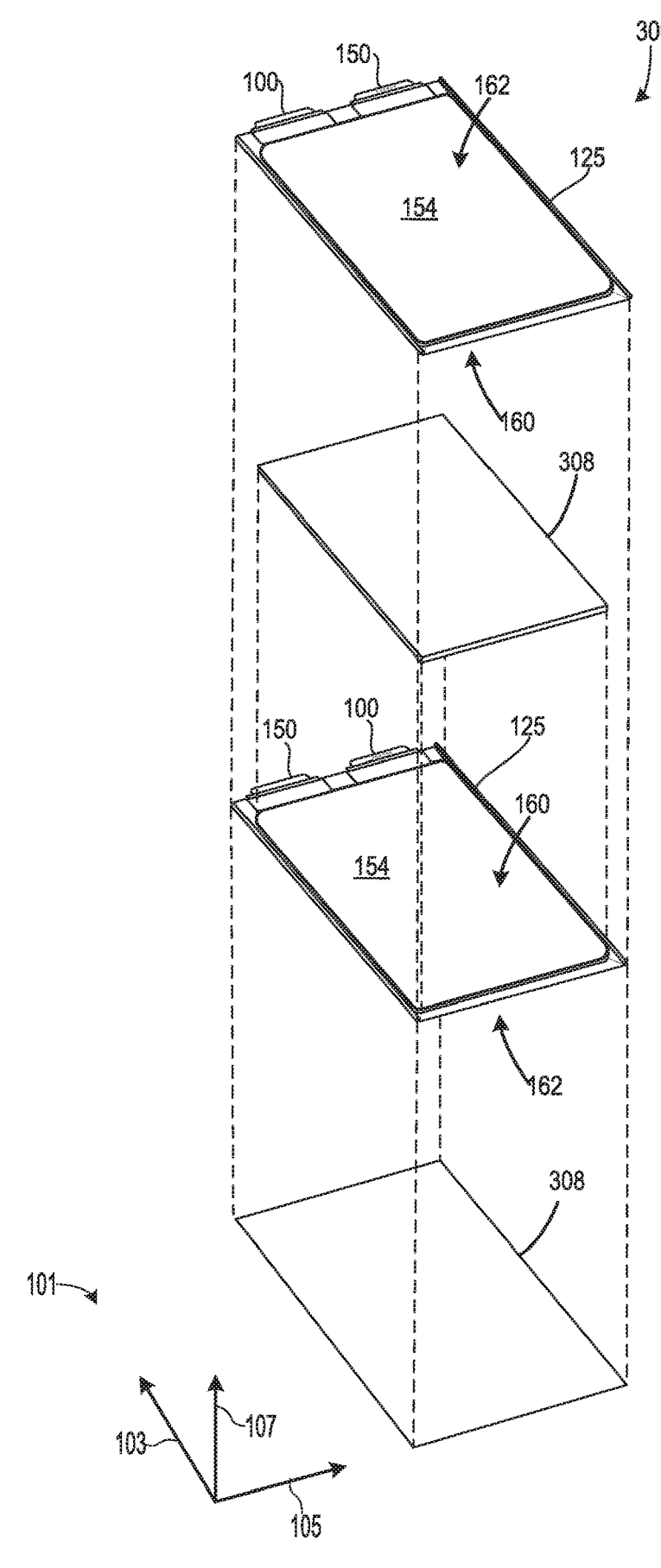
FIG. 3 shows an example stacking configuration for the battery cells of the battery of FIGS. 1A-2, in accordance with an embodiment of the present disclosure.
Figure 5:
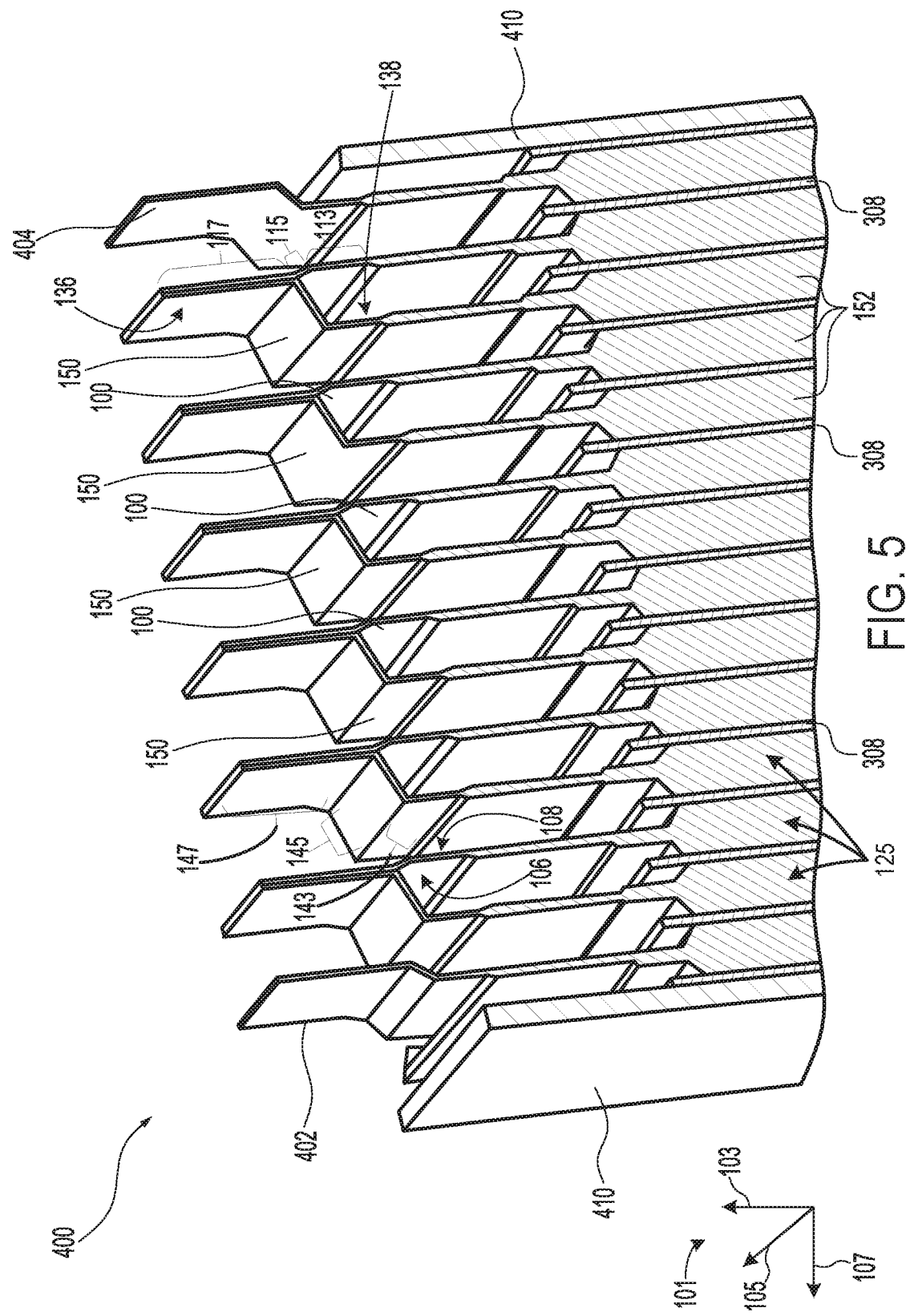
FIG. 5 shows a cross-sectional view of the stacked electrochemical cells of the array of FIG. 4, with only one of the tab terminals of each of the cells exposed, in accordance with an embodiment of the present disclosure.

A plurality of the battery cells may be stacked together, such as in the example stacking configuration shown in FIG. 3. FIGS. 4 and 5 show examples of how the battery cell tab terminals of adjacent cells to be welded may lie with respect to one another after the cells have been stacked. When stacked, the tab terminals may lie flat against one another, in face-sharing contact. In this way, the tab terminals may be more aligned and parallel with respect to one another, than in examples where the tab terminals are not pre-folded prior to stacking. The ends of adjacent, face-sharing tab terminals may be closer to the cell of the tab terminal that is less bent.

Figure 6:
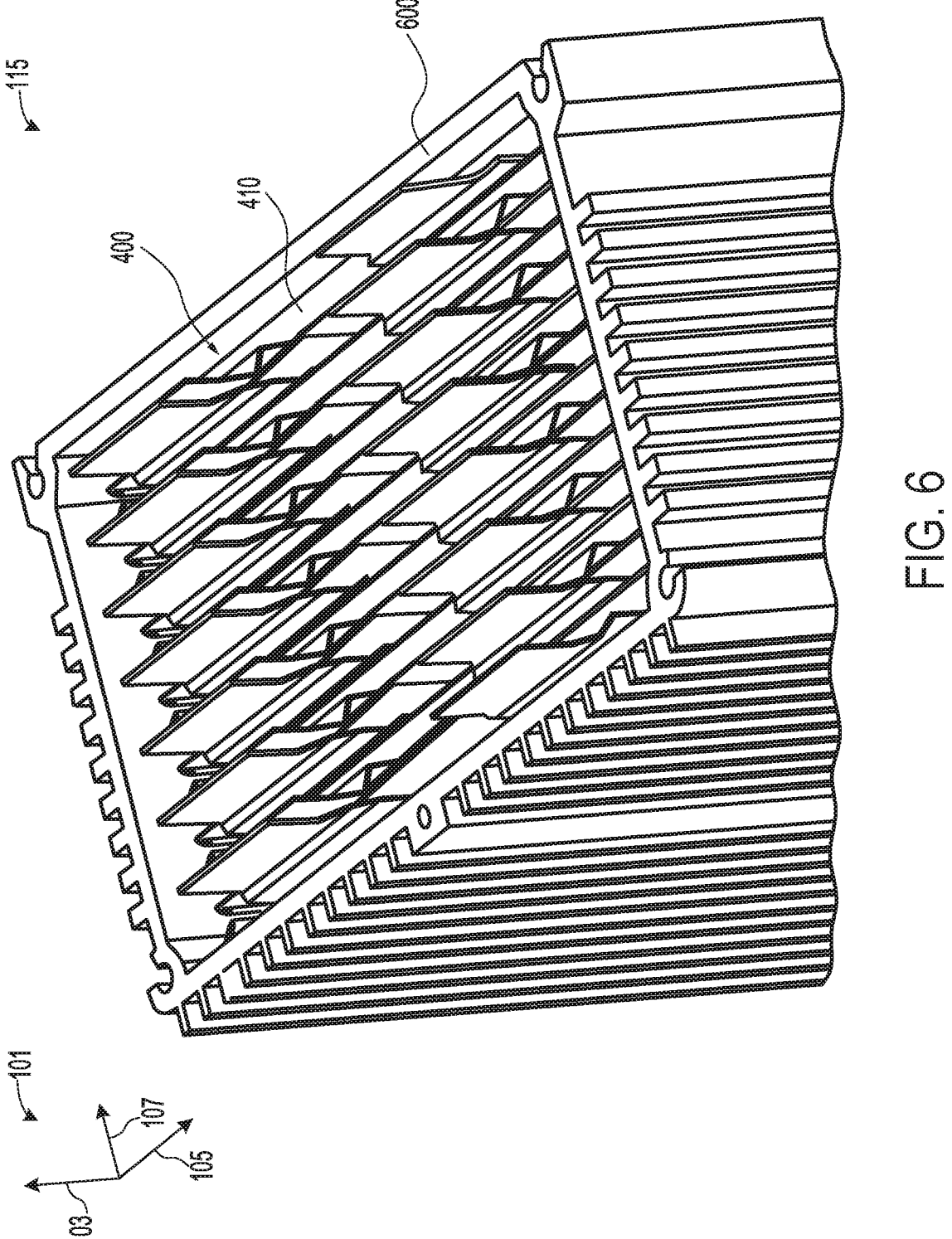
FIG. 6 shows a top isometric view of the battery cell array of FIG. 4, included within a housing, in accordance with an embodiment of the present disclosure.
Figure 7:
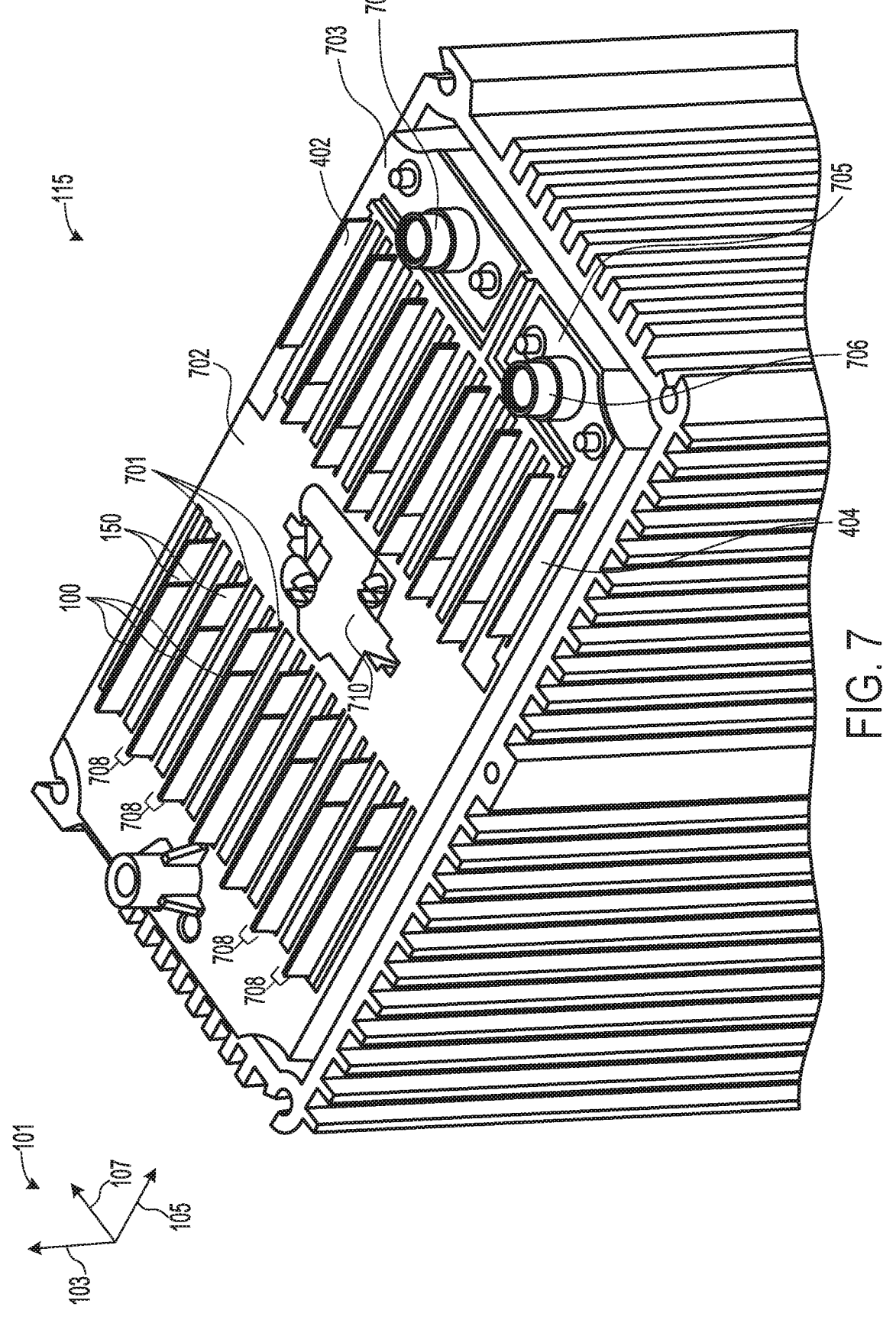
FIG. 7 shows a top isometric view of the array and housing of FIG. 6, including a cell tab support through which the cell tab terminals extend, in accordance with an embodiment of the present disclosure.
Figure 8:
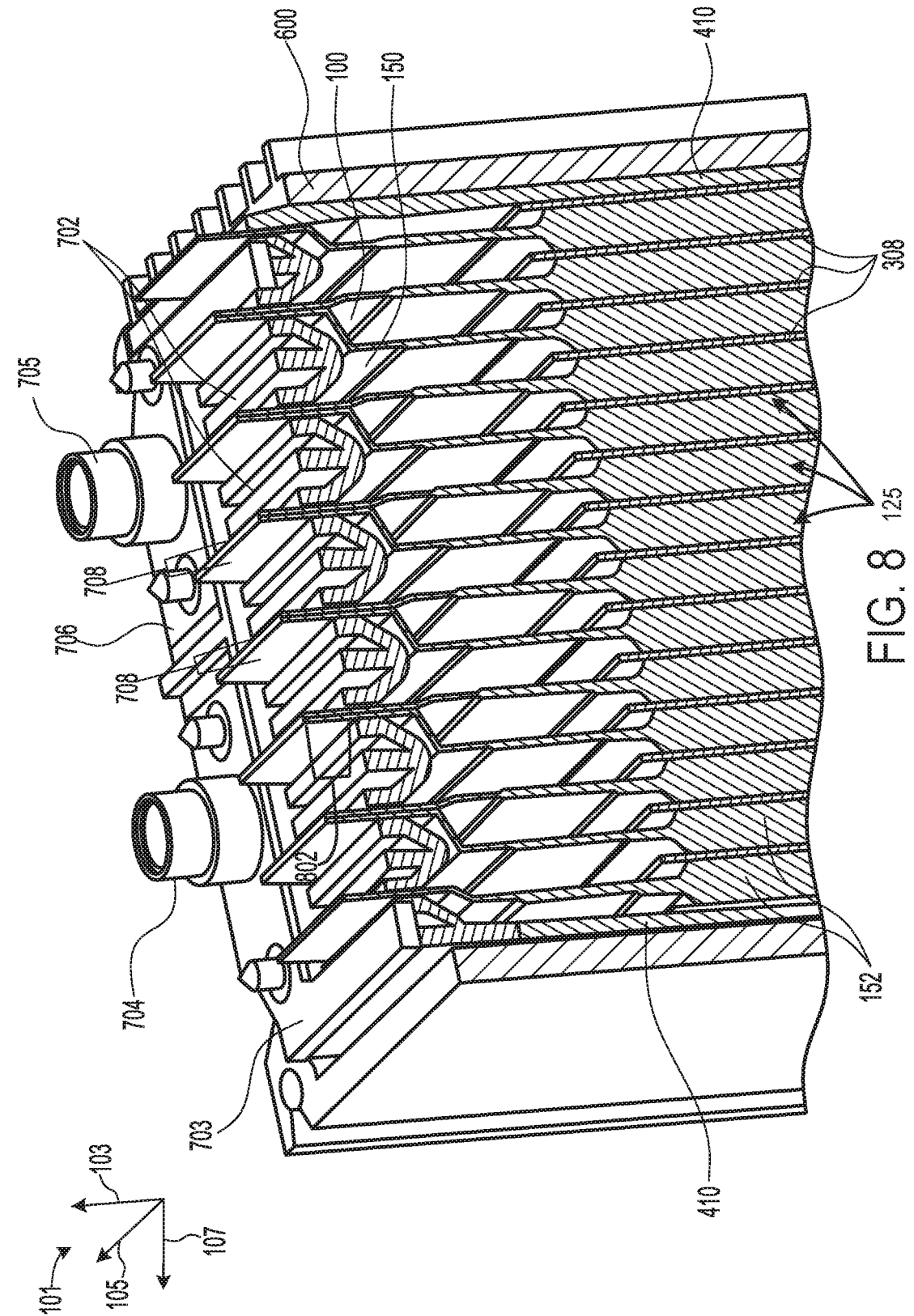
FIG. 8 shows a cross-sectional view of the assembled array, housing, and cell tab support of FIG. 7, with only one of the tab terminals of each of the cells exposed, in accordance with an embodiment of the present disclosure.
Figure 9:
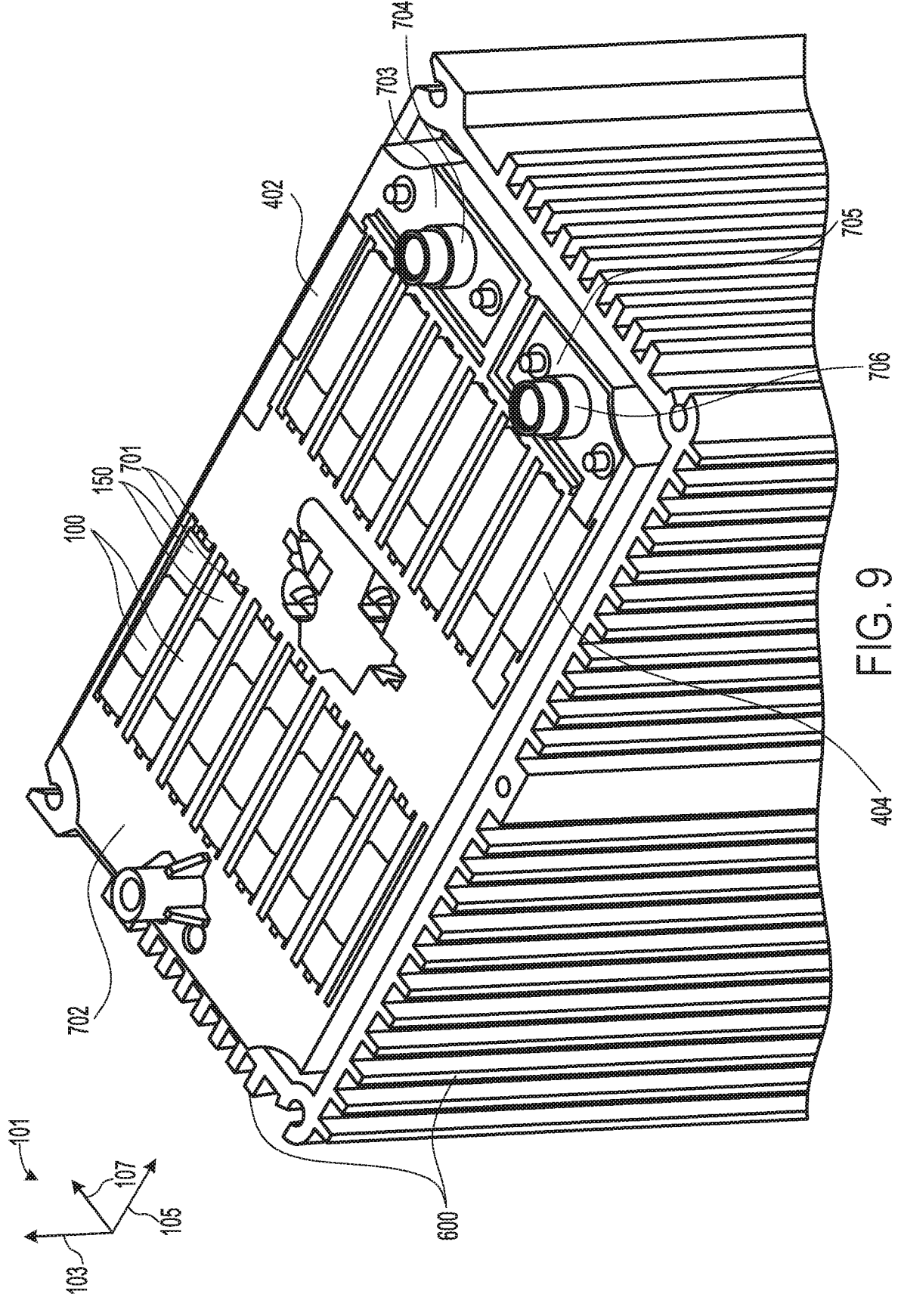
FIG. 9 shows a top isometric view of the assembled array, housing and cell tab support of FIG. 7, with the cells tab terminals folded over the cell tab support, in accordance with an embodiment of the present disclosure.
Figure 10:
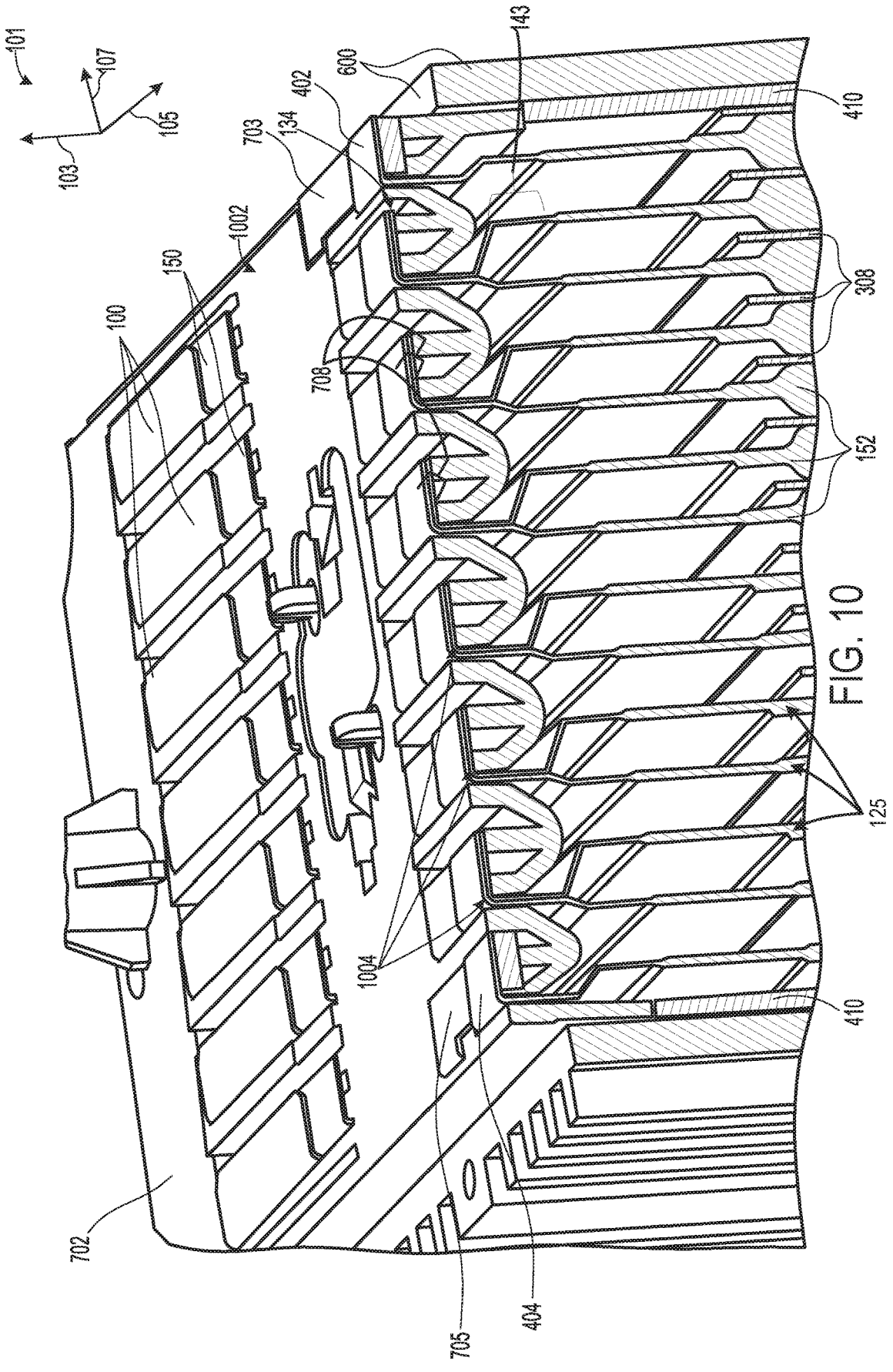
FIG. 10 shows a cross-sectional view of the assembled array, housing and cell tab support of FIG. 9, with the cells tab terminals folded over the cell tab support, in accordance with an embodiment of the present disclosure.
Figure 11:
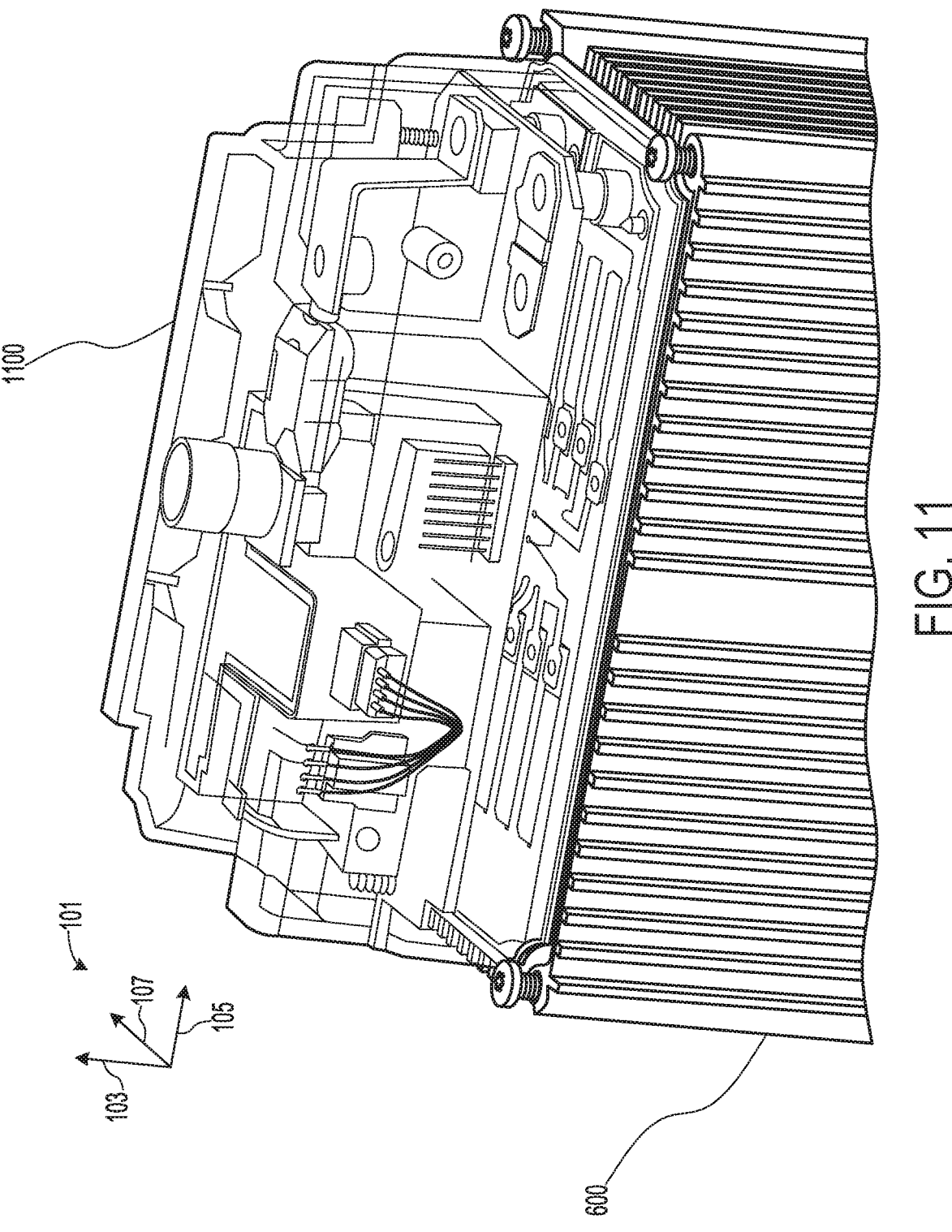
FIG. 11 shows a side isometric view of a fully assembled battery that includes the cell array of FIGS. 4-10, in accordance with an embodiment of the present disclosure.
Figure 12:
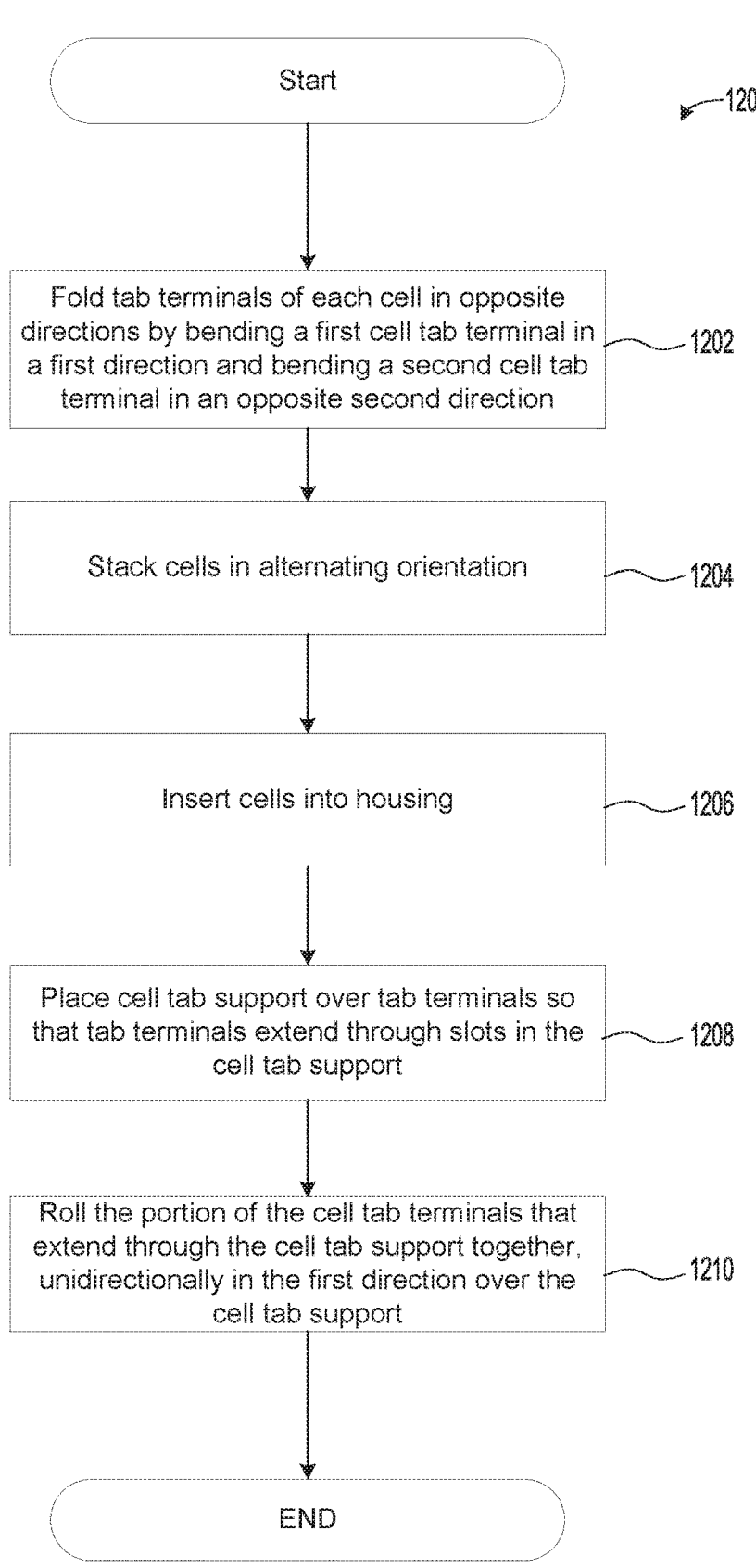
FIG. 12 shows a flow chart of an example method for assembling a battery including pre-folded cell tab terminals, such as the battery of FIG. 11, in accordance with an embodiment of the present disclosure.

Once stacked, the battery cells may be placed within a housing as shown in FIG. 6. A cell tab support may be fitted over the cell tab terminals, such that terminals may extend through the cell tab support as shown in the example of FIGS. 7 and 8. The cell tab terminals of adjacent cells may then be folded over the cell tab support in groups and welded as shown in the examples of FIGS. 9 and 10. The tab terminals may be bent in a direction opposite the direction in which the more bent tab terminal was originally bent prior to stacking (e.g., in the same direction that the less bent tab terminal was originally bent prior to stacking). By pre-bending the cell tab terminals in this manner, and then rolling the tab terminals of adjacent cells together back in a direction opposite the direction in which the more bent tab terminal was originally bent, the distance between the cells may be reduced, and thus the stacking density of the cells may be increased, thereby reducing the size of the battery. A lid or cover may then be coupled to the housing to form a fully assembled battery as shown in the example of FIG. 11. FIG. 12 shows an example method for assembling a battery, such as the battery of FIG. 11.

By pre-folding the battery cell tab terminals, contact area between cell tabs and thus weld integrity may be increased, and packaging size of the battery may be reduced. The battery may be used for various applications including domestic, vehicular, industrial, or other and may be designed, to produce a variety of voltages and currents.

FIGS. 1A-11 are drawn approximately to scale and show the relative sizes and positioning of the components of a battery 115. Further, FIGS. 1A-11 show an axis system 101 including a vertical axis 103, a horizontal axis 105, and a lateral axis 107. The axis system 101 may be used to reference the relative positioning of components of the battery 115. For example, components may be referred to as "above" or "below" one another with respect to the vertical axis 103, where for example, a first component said to be positioned "above" a second component, is positioned further down the positive direction of the vertical axis 103 than the second component. As another examples, components may be referred to as "to the left of" and "to the right of" one another with respect to the horizontal axis 105. As another example, components may be referred to as "in front of" or "behind" one another with respect to the lateral axis 107. For example, a first component said to be positioned "in front of" a second component, is positioned further down the positive direction of the lateral axis 107 than the second component. Movement and relative positioning of components in the vertical direction refers to movement and/or spatial relationship of components along the vertical axis 103, and movement and relative positioning of components in the horizontal direction refers to movement and/or spatial relationship of components along the horizontal axis 105, and movement and relative positioning of components in the lateral direction refers to movements and/or spatial relationship of components along the lateral axis 107.

Further, FIGS. 1A-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the Figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the Figures and used to describe positioning of elements of the Figures relative to one another. As such, elements shown above other elements are positioned vertically above the other elements, in one example. As yet another example, shapes of the elements depicted within the Figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1A, it shows a first side isometric view of battery cell tab terminals of a battery cell 125 of the battery 115. In particular, FIG. 1A illustrates an example of how the cell tab terminals may be pre-bent (also referred to herein as "pre-folded"), prior to stacking the battery cell 125 with other battery cells. The example pre-bending pattern of the tab terminals shown in FIG. 1A reduces the overall volume of the resulting battery pack, while also increasing the durability of the welds that electrically connect the cells of the battery.

Each battery cell 125 includes electrodes (e.g., anode and cathode) contained within a cell body housing 152 and oppositely charged electrode terminals extending outwardly from the cell body housing 152. Thus, each battery cell 125 includes a negative electrode terminal and a positive electrode terminal. The example battery cell 125 shown in FIG. 1A includes two, oppositely charged electrode terminals 100 and 150. In a preferred embodiment, first electrode terminal 100 may be a positive electrode terminal comprising, for example, aluminum, and second electrode terminal 150 may be a negative electrode terminal comprising, for example, copper. However, it should be appreciated that in other embodiments, the charge of the electrodes may be reversed, and the first electrode terminal 100 may instead comprise a negative electrode terminal, and the second electrode terminal 150 may comprise a positive electrode terminal. First and second electrode terminals 100 and 150, respectively, may be configured as tabs that extends outward from the cell body housing 152, and as such may also be referred to herein as first and second cell tab terminals 100 and 150, respectively.

In the example of FIGS. 1A-11 the battery cells are configured as prismatic or pouch-type battery cells, where the housing 152 for the electrodes comprises a pouch. As such, housing 152 may also be referred to herein as pouch 152. However, it should be appreciated that other types of battery cells, such as cylindrical cells may be used, and thus the housing 152 may not be a pouch in such examples. A variety of materials and reagents may be used to create the cell pouch 152. The pouch 152 may be relatively flat with sealed edges to reduce electrolyte loss.

The two cell tab terminals 100 and 150 may be substantially flat and may be co-planar with a central plane of the cell pouch 152. The central plane of the cell pouch 152 may be parallel to a plane defined by the vertical axis 103 and horizontal axis 105, and may pass through a center of the pouch 152. Thus, the two cell tab terminals 100 and 150 may be coupled to the pouch 152 such that the terminals 100 and 150 are substantially equidistant from a front facing surface 160 (not shown in FIG. 1A, but shown and described below in FIGS. 1B and 3) and a rear facing surface 162 (not shown in FIG. 1A, but shown and described below in FIG. 3) of the pouch 152. The first cell tab terminal 100 may extend further vertically than the second cell tab terminal 150, such that when the first cell tab terminal 100 is bent over the second cell tab terminal 150 of an adjacent cell, the ends of the tab terminals of the adjacent cells are aligned. As described herein, the longer length of one of the tab terminals, in combination with the pre-folded configuration of the tabs, enables the pre-folded tab terminals to be assembled in a smaller pack configuration while still enabling the tab terminals to be efficiently and effectively coupled. However, in other examples, the first cell tab terminal 100 may extend to the same vertical height above the pouch 152 as the second cell tab terminal 150.

The cell tab terminals 100 and 150 may include one or more substantially planar surfaces, with a thickness ranging from 0.001 mm to 0.4 mm or thicker. In some examples, the thickness of the cell tab terminals 100 and 150 may be uniform from their bases 102 and 132, respectively, to their top edges, 104 and 134, respectively. However, in other examples, the thicknesses of the terminals 100 and 150 may vary from their bases to their top edges. In some examples, the thicknesses of the cell tab terminals 100 and 150 may be the same as each other, but in other examples, they may be different.

The first cell tab terminal 100 has a front facing surface 106 and a rear facing surface 108, opposite the front facing surface 106. Further, the first cell tab terminal 100 includes peripheral side edges 110 and 112 which may vary in thickness or may be uniform in thickness as described above. The base 102 of the tab terminal 100 may be physically coupled to the pouch 152, and thus, the cell tab terminal 100 extends outwards from the pouch 152 up to the top edge 104 of the tab terminal 100. In particular, the tab terminal 100 may be integrally formed with one of the electrodes, and thus may form a portion or end of one of the electrodes, and may extend out from the pouch 152. First side edge 110 faces towards the second cell tab terminal 150, while an opposite second side edge 112 faces away from the second cell tab terminal 150.

Similarly, the second cell tab terminal 150 has a front facing surface 136 and a rear facing surface 138, opposite the front facing surface 136. Further, the second cell tab terminal 150 includes peripheral side edges 140 and 142 which may vary in thickness or may be uniform in thickness as described above. The base 132 of the tab terminal 150 may be physically coupled to the pouch 152, and thus, the cell tab terminal 150 extends outwards from the pouch 152 up to the top edge 134 of the tab terminal 150. In particular, the tab terminal 150 may be integrally formed with one of the electrodes, and thus may form a portion or end of one of the electrodes, and may extend out from the pouch 152. First side edge 140 faces away from the first cell tab terminal 100, while an opposite second side edge 142 faces towards the first cell tab terminal 100.

As shown in the example of FIG. 1A, the first and second cell tab terminals 100 and 150 may be bent/folded differently prior to cell stacking. In particular, although both terminals 100 and 150 may include two bends, the terminals 100 and 150 may be bent in opposite directions and/or at different bend angles. The terminals 100 and 150 may include lower first bends 109 and 139, respectively, and higher second bends 111 and 141, respectively. The lower first bends 109 and 139 may be positioned more proximate the bases 102 and 132, respectively, than the higher second bends 111 and 141. The bends in the terminals 100 and 150 may define three sections of the terminals 100 and 150. For example, the first cell tab terminal 100 may comprise a lower first section 113, a middle second section 115, and an upper third section 117. Similarly, the second cell tab terminal 150 may comprise a lower first section 143, middle second section 145, and an upper third section 147.

The first sections 113 and 143 may extend from the bases 102 and 132, respectively, up to the first bends 109 and 139, respectively. The second sections 115 and 145 may extend from the first bends 109 and 139, respectively, up to the second bends 111 and 141, respectively. The third sections 115 and 145 may extend from the second bends 111 and 141, respectively, up to the top edges 104 and 134, respectively.

The bend angles of the first and second bends 109 and 111 of the first cell tab terminal 100 may be approximately the same, but in opposite directions, such that the first and third sections 113 and 117 of the first cell tab terminal 100 may be substantially parallel to one another, while the middle second section 115 may be at an angle with respect to the first and third sections 113 and 117, due to the first and second bends 109 and 111. For example, the first and third sections 113 and 117 may be substantially parallel to the central plane of the pouch 152 and the vertical axis 103.

Similarly, the bend angles of the first and second bends 139 and 141 of the second cell tab terminal 150 may be approximately the same, but in opposite directions, such that the first and third section 143 and 147, respectively, may be substantially parallel to one another, while the middle second section 145 may be at angle to the first and third sections 143 and 147 due to the first and second bends 139 and 141. For example, the first and third sections 143 and 147 may be substantially parallel to the central plane of the pouch 152 and the vertical axis 103. Thus, the first and third sections 143 and 147 of the second cell tab terminal 140 may be substantially parallel to the first and third sections 113 and 117 of the first cell tab terminal.

However, the bend angles of the bends 109 and 111 of the first cell tab terminal 100 may be less than the bend angles of the bends 139 and 141 of the second cell tab terminal 150 with respect to the vertical axis 103. Thus, second tab terminal 150 may be more bent than the first cell tab terminal 100 with respect to the vertical axis 103. Therefore, the third section 147 of the second cell tab terminal 150 may be displaced further from the central plane of the pouch 152 than the third section 117 of the first cell tab terminal 100, with respect to the lateral axis 107. That is, the third section 117 of the first cell tab terminal 100 may be closer laterally (e.g., with respect to the lateral axis 107) to the first section 113 of the first cell tab terminal 100 than the third section 147 of the second cell tab terminal 150 is to the first section 143 of the second cell tab terminal 150.

Further, the first and second cell tab terminals 100 and 150 may be bent in opposite directions. The first bend 139 of the second cell tab terminal 150 may comprise a larger positive bend angle of, for example, +60° with respect to the vertical axis 103, and the first bend 109 of the first cell tab terminal 100 may comprise a smaller negative bend angle of, for example, −30° with respect to the vertical axis 103. Thus, the first cell tab terminal 100 is bent in a first direction (e.g., counter-clockwise in the example of FIG. 1A) at the first bend 109, towards the front facing surface 160 of the pouch 152, such that the second and third sections 115 and 117 are displaced in the positive direction of the lateral axis 107, while the second cell tab terminal 150 is bent in an opposite second direction (clockwise in the example of FIG. 1A) at the first bend 139, towards the rear facing surface 162 of the pouch 152, such that the second and third sections 145 and 147 are displaced in the negative direction of the lateral axis 107.

Thus, the first bend 109 of the first cell tab terminal 100 bends the terminal 100 away from the vertical axis 103 towards the positive direction of the lateral axis 107, and the second bend 111 bends the terminal 100 back to vertical (substantially parallel to the vertical axis 103). Similarly, the first bend 139 of the second cell tab terminal 150 bends the terminal 150 away from the vertical axis 103, but towards the negative direction of the lateral axis 107, and the second bend 141 bends the terminal 150 back to vertical. In this way, the second sections 115 and 145 of the two terminals 100 and 150 may not be parallel to one another, and may be at angles to one another, since the second cell tab terminal 150 is more bent than the first cell tab terminal 100. Further, the middle sections 115 and 145 of the tab terminals 100 and 150 may be angled in opposite directions with respect to the vertical axis 103.

In this way, the second cell tab terminal 150 may have a greater total length measured along the trajectory of the tab's surfaces (e.g., a greater un-folded length) than the first cell tab terminal 150. However, when pre-folded, as shown in the example of FIG. 1A, the first cell tab terminal 100 may have a greater or approximately equal height to the second cell tab terminal 150, as explained above. Thus, the top edge 104 of the first cell tab terminal 100 may be vertically above, or approximately vertically equal to the top edge 134 of the second cell tab terminal 100.

It should be appreciated that in other embodiments however, that the first and second cell tab terminals 100 may be bent in the same or similar manner prior to the cell stacking.

The cell pouch 152 comprises a metallic foil pouch containing anode and cathode electrodes. In some examples, the battery 115 may comprise a rechargeable battery. For example, the battery 115 may comprise a lithium-ion battery, and the cell pouch 152 may include lithium ions which move from the negative electrode to the positive electrode during discharge. The cathode comprises an electroactive compound or mixture bonded to aluminum or other suitable positive current collector. A segment of the cathode may protrude from an electrode tab slit 120 and may form one of the tab terminals 100 or 150. The anode comprises an electroactive compound or mixture bonded to copper, copper-plated aluminum, nickel foil or other suitable negative current collector. A segment of the anode protrudes from an electrode tab slit 120 and may form one of the tab terminals 100 or 150. Thus, the tab terminals 100 and 150 may protrude through the tab slits at their bases 102 and 132, respectively.

The cell pouch 152 contains an electrolyte liquid or gel which provides a medium for ion transport. The pouch may be rectangular in shape with two electrode slits 120 located along a top edge 158 of the pouch 152. The cell pouch 152 is vacuum sealed and comprises a sealed edge 154 on all sides with the exception of the electrode slits 120. Protruding upwards from the slits 120, are sleeves 122, which cover the bases 102 and 132 of the protruding tabs 100 and 150. The sleeves 122 may be tightly sealed around the tabs 100 and 150 to prevent electrolyte from escaping the battery cell 125, and to keep contaminants out of the pouch 152.

Figure 1B:
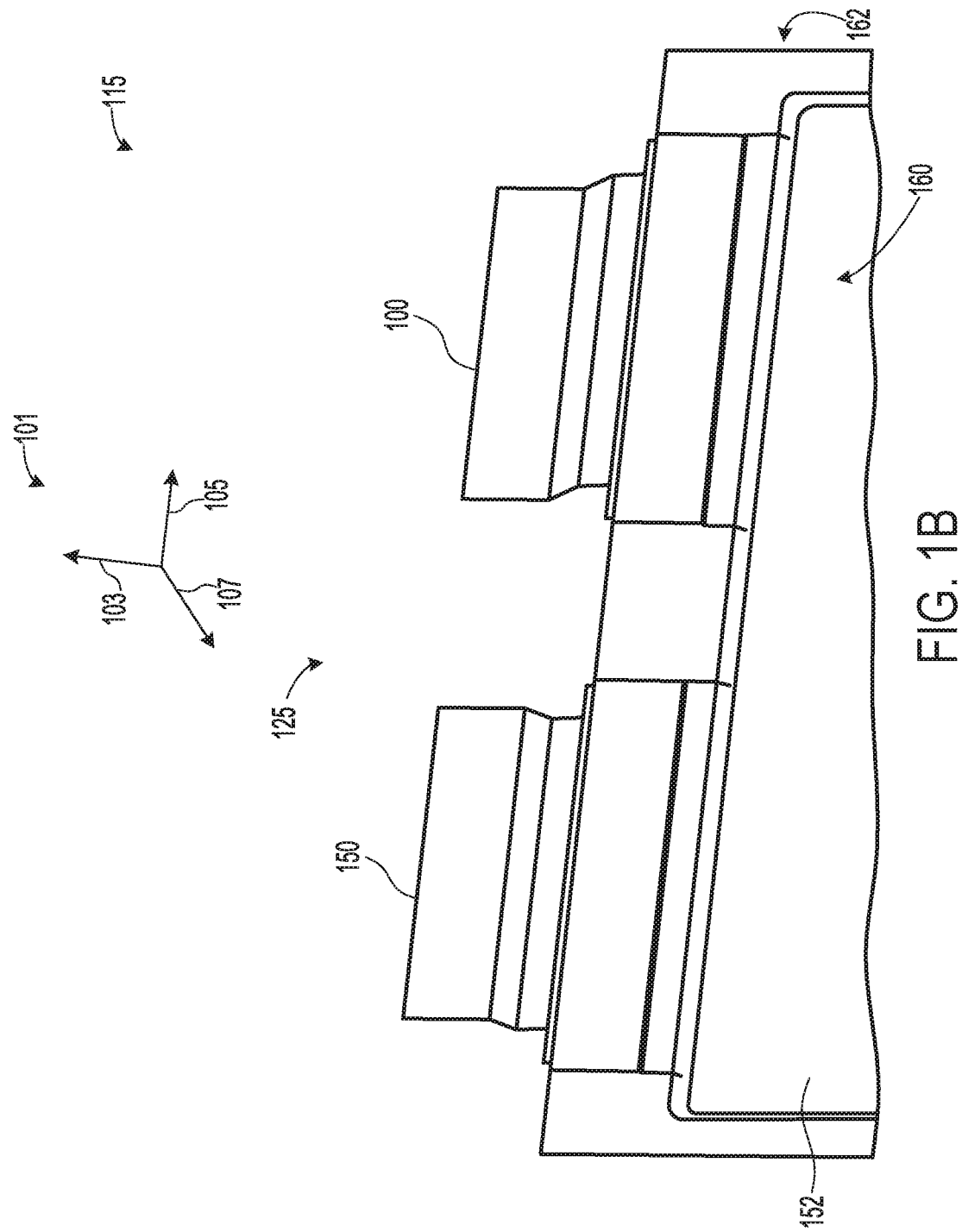
FIG. 1B shows a front isometric view of the pre-folded tab terminals of the electrochemical cell of FIG. 1A, in accordance with an embodiment of the present disclosure.
Figure 2:
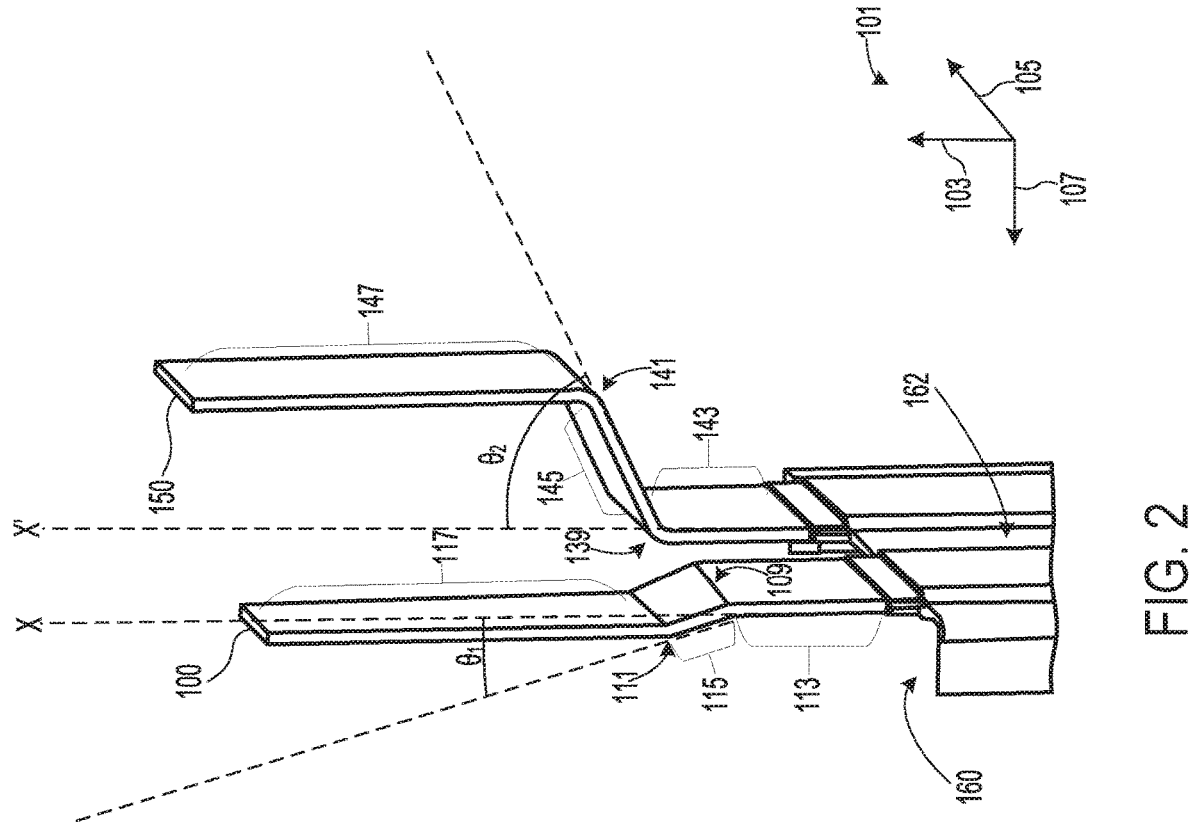
FIG. 2 shows the side isometric view of the pre-folded tab terminals of FIG. 1A, including example bend profiles of the pre-folded tab terminals, in accordance with an embodiment of the present disclosure.

Turning now to FIG. 1B, it shows a front isometric view of the cell tab terminals 100 and 150 of the battery cell 125 of FIG. 1A. The first cell tab terminal 100 is bent towards the front facing surface 160 of the pouch 152, and the second cell tab terminal 150 is bent away from the front facing surface 160 of the pouch 152, towards the rear facing surface 162.

Moving on to FIG. 2, it shows example bend profiles for the cell tab terminals 100 and 150 prior to stacking of multiple cells. In particular, FIG. 2 shows example bend angles for the bends 109 and 111 of the first cell tab terminal 100 and the bends 139 and 141 of the second cell tab terminal 150. The dotted lines X and X' are drawn parallel to the vertical axis 103 to depict the bend angles. Thus, the dotted lines X and X' are parallel to the first sections 113 and 143 and third sections 117 and 147 of the first and second cell tab terminals 100 and 150, respectively, in the example of FIG. 2.

The first cell tab terminal 100 may be bent towards the front facing surface 160 via the first bend 109 at a first bend angle, $\theta_1$. Thus, the first cell tab terminal 100 may be bent counterclockwise in the example of FIG. 2, by the first bend angle $\theta_1$ at the first bend 109. The first cell tab terminal 100 may be bent back towards vertical (clockwise in the example of FIG. 2) by the magnitude of the first bend angle 81 at the second bend 111 such that the first and third sections 113 and 117 are substantially parallel to one another. Thus, the second section 115 may be at an angle to the vertical axis 103 dictated by the first bend angle 81.

Similarly, the second cell tab terminal 150 may be bent at the first bend 139 at a second bend angle, $\theta_1$. However, the second cell tab terminal 150 may be bent at the first bend 139 in an opposite direction to the first bend 109 of the first cell tab terminal 100, and/or at a larger second bend angle 82. Thus, the second cell tab terminal 150 may be bent clockwise in the example of FIG. 2, by the second bend angle 82 at the first bend 139. The second cell tab terminal 150 may be bent back towards vertical (counterclockwise in the example of FIG. 2) by the magnitude of the second bend angle 82 at the second bend 141 such that the first and third sections 143 and 147 are substantially parallel to one another. Thus, the second section 145 may be at an angle to the vertical axis 103 dictated by the second bend angle 82.

The first bend angle 81 may comprise an angle or range of angles between approximately 0 and 50 degrees and the second bend angle 82 may comprise an angle or range of angles between 5 and 70 degrees. Thus, the second bend angle 82 may be larger than the first bend angle 81, and as such, the third section 147 of the second cell tab terminal 150 may be more offset (e.g., further displaced) from the first sections 113 and 143 of the tab terminals 100 and 150 with respect to the lateral axis 107 than the third section 117 of the first cell tab terminal 100. As such, cells are stacked on either side of the cell 125, as will described in greater detail below with reference to FIGS. 3-11, the third section 147 of the second cell tab terminal 150 may be closer to an adjacently stacked cell positioned next to the rear facing surface 162 of the cell 125 than the third section 117 of the first cell tab terminal will be to an adjacently stacked cell positioned on the opposite side of the cell, next to the front facing surface 160.

After the electrodes of a plurality of cell pouches are folded according to the description given above, a plurality of cells may be stacked together. In one example, as shown below in the example of FIG. 3, the cells may be alternately stacked so that they can be connected in series with one another. Thus, in the example of FIG. 3, the plurality of cell pouches are laid out so that the back of each cell pouch abuts the back of another cell pouch, and the front of each cell pouch abuts the front of another cell pouch.

Continuing to FIG. 3, it shows an exploded view 300 of an example stacking configuration for stacking multiple battery cells, such as the battery cell 125 described above with reference to FIGS. 1A-2. As shown in FIG. 3, the battery cells may be alternately stacked so that the rear facing surface 162 of a battery cell 125 faces the rear facing surface 162 of an adjacent battery cell 125. Similarly, the front facing surface 160 of a battery cell 125 faces the front facing surface 160 of an adjacent battery cell 125. In this way, the orientation of the terminals 100 and 150 may be reversed at adjacent cells. This stacking configuration enables the battery cells to be connected in series with one another. However, other stacking configurations are possible for additionally or alternatively connecting one or more of the cells in parallel. Compliance pads 308 may be included between each battery cell 125 to reduce vibration and relative movement of the battery cells. The compliance pads 308 may additionally diffuse heat. The compliance pads 308 may have a width and height that is approximately the same as the width and height of the battery cells or less so that they do not overly increase the overall volume of the cell stack. The compliance pads 308 may be made from foam or another compliance material. Compliance pads 308 may also be placed before the first stacked battery cell and after the last stacked battery cell.

Turning to FIG. 4, it shows a plurality of battery cells, such as the battery cell 125 described above with reference to FIGS. 1A-3, stacked according the stacking configuration described above in FIG. 3, to form an array 400. When stacked, the tab terminals 100 and 150 of adjacent cells may lie flat against one another, in face-sharing contact. FIG. 4 shows terminal 100 nested with terminals 150. In particular, for a given cell 125, the first cell tab terminal 100 bends towards the second cell tab terminal 150 of an adjacent cell, positioned in front of (in the positive direction along the lateral axis 107) the cell 125, and the second cell tab terminal 100 for that cell 125 bends in the opposite direction towards the first cell tab terminal 150 of the other adjacent cell, positioned behind (in the negative direction along the lateral axis 107) the cell 125. Thus, the cell tab terminals 100 and 150 for each cell 125 lie in face sharing contact with the oppositely charged (negative with positive) terminal of an adjacent cells, where the tab terminals 100 and 150 are in face sharing contact with the terminals of different adjacent cells, positioned on opposite sides of the cell 125.

However, the array 400 includes end plates 410 which define a front 403 and back 405 of the array 400. End plates 410 may be placed in front of and behind the array 400. End plates 410 may be approximately as wide as or less wide than the battery cells and may comprise a height as high or less than the battery cells so that they do not overly increase the overall volume of the cell stack. The end plates 410 may comprise a metal and/or plastic. The cells positioned at the ends of the array 400, adjacent to the end plates 410 may only have one cell tab terminal that physically contacts the cell tab terminal of the adjacent cell, while the other tab terminal may be coupled to a bus bar and/or battery terminal. Thus, the cells positioned at the ends of the array may be adjacent to only one cell, since one of the end plates 410 are positioned to one side of the cells.

Further, one of the cell tab terminals for one or both of the battery cells positioned at the ends of the array 400 may be bent differently than the other cell tab terminals. In the example of FIG. 4, the cell furthest to the left, (furthest in the positive direction of the lateral axis 107) in the array 400, adjacent to the end plate positioned at the front 403 of the array 400, includes a second cell tab terminal 150, just as all of the other cells in the array 400 do. However, instead of including a typical first cell tab terminal 100, like the other cells in array 400, first end cell 125*a* may include a first end cell tab terminal 402 which may function the same or similar to the first cell tab terminal 100 (may comprise the same charge, positive or negative, as the first cell tab terminal 100) and may comprise the same material as the first cell tab terminal 100, but may comprise a different bend profile than the first cell tab terminal 100. In particular, the end cell tab terminal 402 may bend in the opposite direction as the first cell tab terminal 100 (same direction as the second cell tab terminal 150) to reduce the packaging size of the array 400. Thus, the terminal 402 may be bent away from the more proximate of the end plates 410, away from the front 403 of the array 400, and towards the interior of the array 400. Said another way, the terminal 402 may be bent towards the adjacent cell.

In some examples, the bend profile of the end cell tab terminal 402 may be the same or similar to that of the second cell tab terminal 150 described above in FIGS. 1A and 2. However, in other examples, the bend angles of first and second bends 409 and 411, respectively, of the end cell tab terminal 402 may be different than that of the second cell tab terminal 150. As one example, the end cell tab terminal 402 may be less bent than the second cell tab terminal 150. In particular, the bend angles of the bends 409 and 411 of the end cell tab terminal 402 may be approximately the same as those of the first cell tab terminal 100, however, the terminal 402 may just be bent in the opposite direction as the first cell tab terminal 100. That is, the orientation of the end cell tab terminal 402 may be flipped 180 degrees relative to the first cell tab terminal 100.

In the example of FIG. 4, the cell furthest to the right, (furthest in the negative direction of the lateral axis 107) in the array 400, adjacent to the end plate positioned at the back 405 of the array 400, includes a first cell tab terminal 100, just as all of the other cells in the array 400, except for the first end cell 125*a* do. However, instead of including a typical second cell tab terminal 150, like the other cells in array 400, second end cell 125*b* may include a second end cell tab terminal 404 which may function the same or similar to the second cell tab terminal 150 (may comprise the same charge, positive or negative, as the second cell tab terminal 150) and may comprise the same material as the second cell tab terminal 150, but may comprise a different bend profile than the second cell tab terminal 150. In particular, the end cell tab terminal 404 may bend in the same direction as the second cell tab terminal 150, however it may bend at less of a bend angle with respect to the vertical axis 103. Thus, the terminal 404 may be bent towards the more proximate of the end plates 410, towards the back 405 of the array 400, and away from the interior of the array 400. Said another way, the terminal 404 may be bent away from the adjacent cell.

Thus, the end cell tab terminal 404 may be less bent than the second cell tab terminal 150. Thus, a third section 447 of the end cell tab terminal 404 may be closer to a first section 443 of the tab terminal 404 (less laterally offset from a central plane of the pouch of the cell) than the third section 147 of a second cell tab terminal 150 is to the first section 143. Adjusting the bend profile of the end cell tab terminal 404 to be less bent than the other second cell tab terminals reduces the packaging size of the array 400 because the end plate at the back 405 of the array 400 can be positioned closer to the cell 125*b* that it would if the bend profile of the second cell tab terminal 150 was used.

In one example, the end cell tab terminal 402 may comprise a positive tab terminal and may be coupled to a bus bar and/or positive terminal of the battery. Thus, the end cell tab terminal 402 may form the positive end of the battery. Further, the second end cell tab terminal 404 may comprise a negative tab terminal and may be coupled to a bus bar and/or negative terminal of the battery. Thus, the second end cell tab terminal 404 may form the negative end of the battery.

FIG. 5 shows a cross-sectional view of the array 400 described above in FIG. 4, with only one of the tab terminals of each of the cells exposed. The third section 147 of the second cell tab terminal 150 of a cell 125 is in face sharing contact with the third section 117 of the first cell tab terminal 100 of an adjacent cell positioned behind the cell 125, and the third section 117 of the cell 125 is in face sharing contact with the third section 147 of the second cell tab terminal 150 of the other adjacent cell positioned in front of the cell 125. In particular, the front facing surface 106 (not shown in FIG. 5, but shown and described above in FIG. 1A) of each first cell tab terminal 100 is in direct face sharing contact with the rear facing surface 138 of the second cell tab terminal 150 of the adjacent, rear cell. Thus, when stacked, the third sections 117 and 147 of the cells are in face sharing contact with one another.

Said another way, the third section 147 of the second cell tab terminal 150 of each cell 125 touches and lies flat against the third section 117 of the first cell tab terminal 100 of the battery cell behind it. Furthermore, the third section 117 of the first cell tab terminal 100 of each cell 125 touches and lies flat against the third section 147 of the second cell tab terminal 150 of the battery cell in front of it. Thus, the terminals 100 and 150 are pre-bent prior to stacking, such that a portion (e.g., the third sections 117 and 147) of oppositely charged terminals of adjacent cells span the distance separating the terminals. Said another way, the bends in the terminals 100 and 150 laterally displace the third sections 117 and 147 of adjacent cells by an amount such that when stacked, the third sections 117 147 span the distance separating the first sections 113 and 143 of adjacent cells and therefore, the third sections 117 and 147 of adjacent cells come into face sharing contact with one another. Thus, there may be no gaps between the third sections 117 and 147 of adjacent cells, such that the entire third section 117 of each cell may be in direct, physical, face sharing contact with the third section 147 of the adjacent cell positioned directly in front.

As can be seen in FIG. 5, since the second cell tab terminal 150 bends further than the first cell tab terminal 100, as explained above with reference to FIGS. 1A and 2, the first and second cell tab terminals 100 and 150 of adjacent cells that are in face sharing contact, physically contact one another more proximate the cell of the first cell tab terminal 100 than the cell of the second cell tab terminal 150. Thus, the point of contact between terminals of adjacent cells is closer to the cell containing the first cell tab terminal 100 than the cell containing the second cell tab terminal 150 with respect to the lateral axis 107.

Said another way, the first bend 139 in each second cell tab terminal 150 allows the middle second section 145 to traverse the majority of the distance between the first section 143 of the second cell tab terminal 150 and the first section 113 of the first cell tab terminal 100 of the adjacent cell to which the second cell tab terminal 150 is in face sharing contact with. Thus, the second section 115 of the first cell tab terminal 100 traverses a smaller lateral distance in the opposite direction as the second section 145 of the second cell tab terminal 150.

By folding the electrode tabs in this way, the area of connection between the tab terminals may be increased. In order to reduce the size of the overall battery system, two exceptions (and in some cases only two exceptions) to this configuration may exist within the array 400; the front-most cell and the rear-most cell may include cell tab terminals that do not bend in the same pattern as the terminals of the other cells in the array 400 as explained above with reference to FIG. 4.

FIG. 6 shows a top isometric view of the battery cell array 400 of FIGS. 4 and 5, included within a housing 600. The housing 600 may be constructed from a plastic, as an example. The housing 600 may be constructed so that the cell array 400 including compliance pads 308 and end plates 410 fit within the housing 600 and do not shift or movement within the housing 600. The housing may have one or more fins for improving heat transfer. Further, connecting slots may be provided for combining the housing with further module housings.

FIG. 7 illustrates the same isometric view of the battery as shown above in FIG. 6, with a cell tab support 702 included. The cell tab support 702 may comprise a plastic or other electrically non-conducting materials. As such, the cell tab support 702 may not carry current.

The cell tab support 702 includes slits 701 through which the terminals 100 and 150 extend. In particular, as described above with reference to FIG. 6, the third sections 117 and 147 (not shown in FIG. 7) of oppositely charged terminals of adjacent cells may be in face sharing contact with one another to form touching pairs 708. These touching pairs 708 of adjacent terminals 100 and 150 extend through the slits 701 of the cell tab support 702. Thus, the cell tab support 702 is placed over the array 400 such that the third sections 117 and 147 of the cells extend through the slits 701 of the support 702. The distance between slits 701 may be greater than the distance that the cell tab terminals 100 and 150 protrude through the cell tab support 702, so that when folded over the support 702, the cell tab terminals 100 and 150 of different touching pairs 708 do not contact one another.

Also protruding through the cell tab support 702 are the unpaired first end cell tab terminal 402 and the unpaired second end cell tab terminal 404. A first bus bar 703 may be included on top of the cell tab support 702, in front of the first end cell tab terminal 402. The first end cell tab terminal 402 may then be folded down on top of the first bus bar 703 to electrically couple the terminal 402 to the bus bar 703. The bus bar 703 may be electrically coupled on an opposite end to a first battery terminal 704. Thus, the bus bar 703 electrically connects the end cell tab terminal 402 to the first battery terminal 704.

Similarly, a second bus bar 705 may be included on top of the cell tab support 702, in front of the second end cell tab terminal 404. The second end cell tab terminal 404 may then be folded down on top of the second bus bar 705 to electrically couple the terminal 404 to the bus bar 705. The bus bar 705 may be electrically coupled on an opposite end to a second battery terminal 706. Thus, the bus bar 705 electrically connects the end cell tab terminal 404 to the second battery terminal 706.

The battery terminals 704 and 706 form the terminals of the battery 115 and thus may be opposite in charge, with one terminal being the positive end of the battery 115, and the other terminal being the negative end of the battery 115. As one example, the battery 115 may then provide power to various vehicle electrical systems, and/or provide drive torque to vehicle wheels by electrically coupling, via wires or cables for example, the terminals 704 and 706 of the battery 115 to the desired vehicle components.

As shown in the example of FIG. 7, the bus bars are only included between the cell tab support 702 and the end cell tab terminals 402 and 404. Thus, bus bars are not included elsewhere above the support 702, such as between the support 702 and terminals 100 and 150. In this way, the cell tab terminals 100 and 150 carry the current between the cells via their face sharing contact with one another. However, in other examples, bus bars may be included between the support 702 and the terminals 100 and 150, and the terminals 100 and 150 may be coupled to the bus bars such that the bus bars carry at least some of the current of the battery 115.

The cell tab support 702 also may provide an indentation 710 or other structure on which circuitry may be overlaid, such as a flexible printed circuit, a board-to-board connector, connector support and/or thermistors.

FIG. 8 shows a cross-sectional view of the assembled array 400, housing 600, and cell tab support 702 of FIG. 7, with only one of the tab terminals from each of the cells exposed. Thus, FIG. 8 may show the same or similar view of the array 400 as FIG. 5, except that in FIG. 8, the housing 600 and cell tab support 702 are also included. As shown in FIG. 8, the touching pairs 708 of terminals 100 and 150 extend through the cell tab support 702 such that a protruding portion 802 of the terminals 100, 150, 402, and 404 extends through the cell tab support 702. As shown in the example of FIG. 8, the protruding portion 802 of the terminals 100, 150, 402, and 404 may be vertically aligned and parallel to one another. The protruding portion 802 of the terminals 100, 150, 402, and 404 may then be bent/rolled over the cell tab support 702 as described below in FIGS. 9 and 10.

FIG. 9 shows a top isometric view of the assembled array, housing 600 and cell tab support 702 after the cells tab terminals 100, 150, 402, and 404 have been rolled over the cell tab support 702. Thus, FIG. 9 may show the same or similar view of the battery 115 as FIG. 7, except that in FIG. 9, the tab terminals 100, 150, 402, and 404 are shown folded over the cell tab support 702. The first end cell tab terminal 402 is bent over the first bus bar 703, and may be in face sharing contact with the bus bar 703. Similarly, the second end cell tab terminal 404 is bent over the second bus bar 705, and may be in face sharing contact with the bus bar 705. In this way, the first terminal 704 may be electrically connected to the first end cell tab terminal 402 and the second terminals 706 may be electrically connected to the second end cell tab terminal 404.

Further, in the example of FIG. 9, the cell tab terminals 100, 150, 402, and 404 are folded in the same direction over the cell tab support 702. In particular, the cell tab terminals 100, 150, 402, and 404 are folded in the same direction that the first cell tab terminal 100 was originally folded (e.g., pre-folded) prior to stacking, and thus in the opposite direction that the second cell tab terminal 150 was originally folded. Thus, the terminals 100, 150, 402, and 404 are bent forwards with respect to the lateral axis 107. The terminals 100, 150, 402, and 404 may be bent approximately 90 degrees with respect to their vertical positions shown in FIG. 7. The terminals 100, 150, 402 and 404 may be bent or rolled over the cell tab support 702 by a machine roller. By pre-folding the cells prior to stacking, such that the terminals of adjacent cells are in face sharing contact with one another when stacked, the terminals 100, 150, 402, and 404 may all be rolled together, in the same direction. Thus, the machine roller, may roll all of the terminals at approximately the same instance, in one unidirectional movement.

Each second cell tab terminal 150 may be positioned between the cell tab support 702 and a first cell tab terminal 100. Thus, by bending the touching pairs 708 in the first direction that each first cell tab terminal 100 was originally bent prior to stacking, each first cell tab terminal 100 may fold over, on top of the second cell tab terminal 150 of the adjacent cell positioned directly in front of the cell containing the first cell tab terminal.

In the example of FIG. 9, the second cell tab terminal 150 is wider than the first cell tab terminal 100. That is, the second cell tab terminal 150 extends further along the horizontal axis 105 than the first cell tab terminal 100. As such at least a portion of each second cell tab terminal 150 not covered by a first cell tab terminal 100. The surface area of the second cell tab terminal 150 that is left uncovered by the first cell tab terminal 100 may then be used to couple the second cell tab terminal 150 to a bus bar or other electrical connection, such as a flex circuit or thermistor. For example a copper electrical connection may be positioned above the terminals 100 and 150 and then welded to one or more of the terminals 100 and/or 150. Weld integrity for welds between the copper connection element and a cell tab terminal is increased when the copper connection element can be directly welded to the negative electrode terminal, because of the material composition of the negative electrode terminal. For example, the negative electrode material may comprise copper which provides a more durable weld with a copper connection element than a material of a positive electrode terminal, such as aluminum.

Thus, in examples where the cell tab terminal 150 comprises a negative electrode terminal, and therefore comprises a material such as copper, the weld integrity of welds between the cell tab terminal 150 and an electrical connection positioned on top of the terminal 150 may be increased by constructing the cell tab terminal 100 to be narrower than the terminal 150, thus allowing for a portion of the terminal 150 to be left exposed when the cells are folded over the cell tab support 702. The copper connection element may then be directly welded to the exposed surface area of the second cell tab terminal 150 that is left uncovered by the first cell tab terminal 100. In examples where the terminal 100 is as wide as the terminal 150, and thus the rear facing surface 138 of the terminal 150 is not exposed, the copper connection must be welded to the terminal 100. In examples where the terminal 100 comprises a positive electrode terminal, and therefore comprises a material such as aluminum, the weld integrity of the subsequent weld between the copper connection and the aluminum terminal 100 may be reduced relative to the weld integrity of a weld between the copper connection and a copper terminal.

Moving on to FIG. 10, it shows a cross-sectional view of the assembled array, housing and cell tab support of FIG. 9, with the cells tab terminals 100, 150, 402, and 404 folded over the cell tab support 702. As shown in the example of FIG. 10, the terminal 100, 150, 402, and 404 are folded approximately 90 degrees, clockwise in the example of FIG. 10, in the first direction in which the first cell tab terminal 100 was originally folded prior to stacking. Thus, the second cell tab terminal 150 of each cell 125 is bent back towards the cell pouch 152 from which it extends, in the opposite direction which it was originally bent prior to stacking. Because the second cell tab terminal 150 is pre-bent away from the pouch 152 in the second direction prior to stacking, and then is bent back the first direction, opposite the second direction after stacking, the total lateral displacement of the tab terminal 150 may be reduced. For example, as shown in the example of FIG. 10, the top edge 134 of the second cell tab terminal 150 may be approximately aligned with the first section 143 of the tab terminal 150, after the terminal 150 has bent rolled over the cell tab support 702. Thus, by reducing the total lateral displacement that the terminal 150 is bent, the distance between adjacent cells may be reduced, the packing density of the cells may be increased, and the overall packaging size of the battery 115 may be reduced, relative to examples, where the terminal 150 is not pre-folded prior to stacking and/or the terminal 150 is not bent in opposite directions before and after stacking.

Thus, the terminals 100, 150, 402, and 404 are folded or bent approximately 90 degrees over a top 1002 of the cell tab support 702 so that the protruding portion 802 (not labelled in FIG. 10, but labelled and described above in FIG. 8) of the cell tab terminal 100 is pressed down flat on top of the protruding portion 802 of the cell tab terminal 150. As described above with reference to FIGS. 4-7, the third sections 117 and 147 (not labelled in FIG. 10, but labelled above in FIGS. 1A, 2, and 5) of the tab terminals 100 and 150, respectively, of adjacent cells may be in face sharing contact with one another, and may lie flat against one another, when the cells are stacked. As the terminals 100 and 150 are rolled over the cell tab support 702, the third sections 117 and 147 of the adjacent cells may remain in intimate contact with one another, since they are folded over the cell tab support 702 together (concurrently). Thus, by pre-folding the cells and stacking them such that the touching pairs 708 of terminals 100 and 150 lie flat against one another prior to rolling the terminals 100 and 150 over the cell tab support 702, more intimate contact between the terminals 100 and 150 may be maintained and achieved after the terminals 100 and 150 are rolled over the cell tab support 702. In some examples, a substantial portion of the tab terminals 100, 150, 402, and 404 lie flat on the cell tab support 702.

Thus, the terminals 100 and 150 may comprise third bends 1004 which bend the terminals 100 and 150 over the cell tab support 702. The third bends 1004 may comprise bend angles greater than the first and second bend angles of the bends 109, 111, 139 and 141 described above with reference to FIG. 2. For example, the third bends 1004 may in some examples comprise bend angles of approximately 90 degrees. In particular, the third bends 1004, bend the protruding portion 802 of each of the terminals 100, 150, 402, and 404 over the cell tab support 702.

In some examples, the touching pairs 708 of terminals 100 and 150 may not be welded together and may be electrically connected to one another by sufficient surface contact with one another after being folded over the cell tab support 702. However, in other examples, the terminals 100 and 150 of adjacent cells may be welded together, using for example, laser lap welding.

FIG. 11 shows a side isometric view of the battery 115 fully assembled, with a lid or cover 1100 coupled to the housing 600. The lid 110 may be coupled to the housing 600 via fasteners such as screws, bolts, etc.

FIG. 12 shows a flow chart of an example method 1200 for assembling a battery including pre-folded cell tab terminals, such as the battery 115 of FIG. 11. Method 1200 begins at 1202 which comprises folding tab terminals (e.g., tab terminals 100 and 150 described above in FIGS. 1A-11) of a battery cell (e.g., cell 125 described above in FIGS. 1A-11) in opposite directions by bending a first cell tab terminal (e.g., first cell tab terminal 100 described above in FIGS. 1A-11) in a first direction and bending a second cell tab terminal (e.g., second cell tab terminal 150 described above in FIGS. 1A-11) in an opposite second direction. For example, the method 1200 at 1202 may comprise bending the first cell tab terminal counterclockwise and bending the second cell tab terminal clockwise. Further, the method 1200 at 1202 may comprise bending the second cell tab terminal to a greater degree than the first cell tab terminal. Thus, the second cell tab terminal may be more bent than the first cell tab terminal.

Method 1200 then continues to 1204 which comprises stacking multiple cells with the pre-folded tab terminals in an alternating orientation, in the same or similar manner to that described above in FIG. 3. In particular, the cells may be stacked so that for adjacent cells, oppositely charged terminals of the cells abut one another. The method 1200 may then proceed to 1206 which comprises inserting the cells in a housing (e.g., housing 600 described above in FIG. 6). After placing the cells in the housing, a cell tab support (e.g., cell tab support 702 described above in FIGS. 7-11) may be placed over the tab terminals so that the tab terminals extend through slots (e.g., slits 701 described above in FIG. 7) in the cell tab support.

The method 1200 may then proceed from 1208 to 1210 which comprises rolling the portion of the cell tab terminals that extend through the cell tab support together, unidirectionally in the first direction over the cell tab support. Thus, the portion of the cell tab terminals that extend above the cell tab support may be rolled/bent over the cell tab support in a direction opposite the direction which the second cell tab support was originally bent prior to stacking. Method 1200 then ends.

In one representation, a system may comprise a first battery cell, second battery cell, and third battery cell. The three battery cells may each include two oppositely charged cell tab terminals that protrude from one side of the battery cells. The three battery cells may be stacked, with their tab terminals all extending in the same direction from the stacked group of battery cells. The second battery cell may be positioned between the first battery cell and the third battery cell, but may be flipped with respect to the first and third battery cells such that its battery cells still face the direction as the first and third battery cells, but are orientated in an opposite direction such that each battery cell tab terminal of the second battery cell is aligned with an oppositely charged battery cell tab terminal of the first and third battery cells. The two cell tab terminals of each cell may be offset from their cell in opposite directions, such that the oppositely charged terminals of adjacent cells are bent towards each other. That is, if the negative cell tab terminal of the second battery cell is offset towards the third battery cell, then the positive cell tab terminal of the third battery cell is offset towards the second battery cell, so that it is in face sharing contact with the negative cell tab terminals of the second battery cell when stacked. Further, in the example provided above, the positive cell tab terminal of the second battery cell would be offset towards the first battery cell and the negative cell tab terminal of the first battery cell would offset towards the second battery cell such that the negative cell tab terminal of the first battery cell and the positive cell tab terminal of the second battery cell are in face sharing contact with one another when stacked.

Thus, by pre-folding the tab terminals of prismatic type battery cells, an amount of surface area contact between the terminals of adjacent cells may be increased. Specifically, by pre-folding the tab terminals of the cells such that the ends of the tab terminals are offset from the bases of the terminals, the terminals of adjacent cells may span the distance separating the adjacently stacked cell tab terminals, and thus come into physical contact with one another. As such, mismatching of the terminals and air gaps between the terminals to be welded may be reduced. Therefore, a technical effect of increasing weld integrity between battery cells terminals, and increasing battery longevity is achieved by pre-folding the tab terminals prior to stacking the cells.

Further, by bending one of the cell's tab terminals more than the other prior to stacking, and then bending touching pairs of terminals of adjacent cells together in a direction opposite the direction that the more bent terminal was originally bent prior to stacking, the distance between the cells may be reduced, and thus the packaging size of the battery may be reduced.

Further, all of the cell tab terminals of the battery may be rolled together at once, in one direction since the cell tab terminals of adjacent cells are already contacting one another prior to rolling the terminals over a cell tab support. Thus, since the terminals of adjacent cells physically contact one another and lie flat against one another when stacked, due to their pre-folded geometry, the terminals may be rolled over together in pairs in one machine tab-rolling process. A technical effect of reducing manufacturing time and expense is therefore achieved, by providing tab terminal geometries which enable unidirectional rolling of all of the tab terminals, approximately simultaneously. Further, since the terminals of adjacent cells already lie flat against one another prior to being rolled over the cell tab support, surface area contact between the adjacent terminals may be maintained as the cells are rolled together. Thus, an amount of surface area contact between the cells, after the cells have been rolled may be increased relative to approaches where the terminals of adjacent cells are rolled separately and/or consecutively.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery, comprising:

a cell tab support; and a plurality of stacked battery cells, each of the plurality of stacked battery cells comprising two oppositely charged cell tab terminals which protrude through the cell tab support and are bent in a first direction over the cell tab support, wherein the two oppositely charged cell tab terminals include a first cell tab terminal and a second cell tab terminal, wherein the first cell tab terminal is pre-folded and includes a lower first section, a middle second section and an upper third section and the second cell tab terminal is pre-folded and includes a lower first section, a middle second section and an upper third section, wherein the upper third section of the first cell tab terminal is displaced in along a lateral axis from the lower first section of the first cell tab terminal in the first direction by a first distance and the upper third section of the second cell tab terminal is displaced along the lateral axis from the lower first section of the second cell tab terminal in a second direction opposite the first by a second distance, the first distance being shorter than the second distance, wherein each of the plurality of stacked battery cells is adjacent to an adjacently stacked battery cell, the adjacently stacked battery cell including a first cell tab terminal pre-folded as the first cell tab terminal of the plurality of stacked battery cells including an upper third section displaced in the first direction by the first distance and a second cell tab terminal pre-folded as the second cell tab terminal of the plurality of stacked battery cells including an upper third section displaced in the second direction by the second distance, and wherein at least a portion of the first cell tab terminal of each of the plurality of stacked battery cells is in face sharing contact and nested with the second cell tab terminal of the adjacently stacked battery cell and the second cell tab terminal of each of the plurality of stacked battery cells is in face sharing contact and nested with the first cell tab terminal of the adjacently stacked battery cell.

2. The battery of claim 1, wherein the first cell tab terminal of each of the plurality of stacked battery cells is bent between the lower first section and the middle second section in the first direction towards a front of the battery.

3. The battery of claim 1, wherein the first cell tab terminal of the adjacently stacked battery cell is in face sharing contact with the second tab terminal of the plurality of stacked battery cells where not folded over the cell tab support.

4. The battery of claim 1, wherein the second cell tab terminal of each of the plurality of stacked battery cells is positioned between the first cell tab terminal of the adjacently stack battery cell and the cell tab support, a portion of the second cell tab terminal protruding through the cell tab support is bent in the first direction.

5. The battery of claim 1, wherein the first cell tab terminal of the adjacently stacked battery cell is welded to the second cell tab terminal of each of the plurality of stacked battery cells at protruding portions of the first cell tab terminal and the second cell tab terminal.

6. The battery of claim 1, wherein the second cell tab terminal of each of the plurality of stacked battery cells is wider than the first cell tab terminal of each of the plurality of stacked battery cells, and wherein the second cell tab terminal comprises copper and the first cell tab terminal comprises aluminum.

7. The battery of claim 1, further comprising end cells positioned at either end of the plurality of stacked battery cells, the end cells comprising at least one cell tab terminal that is bent differently than the first and second cell tab terminals of the plurality of stacked battery cells.

8. The battery of claim 7, wherein both cell tab terminals of the end cells are bent between a lower first section and middle second section in a same direction.

9. The battery of claim 7, wherein both cell tab terminals of the end cells are bent between a lower first section and middle second section in a second direction, away from the front of the battery.

10. The battery of claim 7, further comprising bus bars positioned between the end cells and the cell tab support, the bus bars electrically coupling the end cells to terminals of the battery.

11. A battery, comprising:

a cell tab support; and a plurality of stacked battery cells, each of the plurality of stacked battery cells including two oppositely charged pre-folded cell tab terminals protruding through the cell tab support, wherein the two oppositely charged pre-folded cell tab terminals of a battery cell of each of the plurality of stacked battery cells includes a first cell tab terminal and a second cell tab terminal, wherein the first cell tab terminal includes two bends, a first bend between a lower first section and a middle second section, and a second bend between the middle second section and an upper third section, and wherein the second cell tab terminal includes two bends, a first bend between a lower first section and a middle second section and a second bend between the middle second section and an upper third section, wherein the middle second section of the first cell tab terminal is shorter than the middle second section of the second cell tab terminal, wherein an angle of the first bend of the first cell tab terminal is smaller than an angle of the first bend of the second cell tab terminal and the first bend of the first cell tab terminal is in an opposite direction of the first bend of the second cell tab terminal, and wherein at least a portion of the first cell tab terminal of a battery cell of the plurality of stacked battery cells lies flat against the second cell tab terminal of an adjacent battery cell of the plurality of stacked battery cells.

12. The battery of claim 11, wherein the angle of the first bend of the first cell tab terminal is equal to and in an opposite direction of an angle of the second bend of the first cell tab terminal, and wherein the angle of the first bend of the second cell tab terminal is equal to and in an opposite direction of an angle of the second bend of the second cell tab terminal.

13. The battery of claim 11, wherein the angle of the first bend of the first cell tab terminal is between 0° and 50° and the angle of the first bend of the second cell tab terminal is between 5° and 70°.

14. A battery, comprising:

a cell tab support including an indentation on which circuitry is overlaid, wherein the cell tab support does not carry current;

a plurality of stacked battery cells, each of the plurality of stacked battery cells comprising two oppositely charged cell tab terminals protruding through and bent over the cell tab support in a first direction; and an end cell positioned adjacent to the plurality of stacked battery cells, the end cell comprising two oppositely charged pre-folded cell tab terminals, and wherein each of the two opposite charged cell tab terminals of the end cell are pre-folded to include a first bend between a lower first section and a middle second section and a second bend between the middle second section and an upper third section, and the first bend of each of the two opposite charged cell tab terminals of the end cell is in the same direction.

15. The battery of claim 14, further comprising a bus bar positioned between one of the two oppositely charged pre-folded cell tab terminals of the end cell of the plurality of stacked battery cells and the cell tab support, and wherein the bus bar is not positioned between two oppositely charged pre-folded cell tab terminals of battery cells which are not end cells and the cell tab support.

16. The battery of claim 14, wherein the overlaid circuitry is a flexible printed circuit, a board-to-board connector, connector support and/or thermistors.

\* \* \* \* \*